United States Patent
Wilson et al.

(10) Patent No.: US 7,020,537 B2
(45) Date of Patent: Mar. 28, 2006

(54) TUNING ELECTRODES USED IN A REACTOR FOR ELECTROCHEMICALLY PROCESSING A MICROELECTRONIC WORKPIECE

(75) Inventors: Gregory J. Wilson, Kalispell, MT (US); Paul R. McHugh, Kalispell, MT (US); Robert A. Weaver, Whitefish, MT (US); Thomas L. Ritzdorf, Bigfork, MT (US)

(73) Assignee: Semitool, Inc., Kalispell, MT (US)

( * ) Notice: Subject to any disclaimer, the term of this patent is extended or adjusted under 35 U.S.C. 154(b) by 504 days.

(21) Appl. No.: 09/849,505

(22) Filed: May 4, 2001

(65) Prior Publication Data

US 2002/0032499 A1    Mar. 14, 2002

Related U.S. Application Data

(63) Continuation-in-part of application No. PCT/US00/10120, filed on Apr. 13, 2000.

(60) Provisional application No. 60/206,663, filed on May 24, 2000, provisional application No. 60/182,160, filed on Feb. 14, 2000, provisional application No. 60/143,769, filed on Jul. 12, 1999, provisional application No. 60/129,055, filed on Apr. 13, 1999.

(51) Int. Cl.
*G06F 19/00* (2006.01)

(52) U.S. Cl. .......................... 700/123; 700/37; 700/44; 700/45; 700/121; 700/262; 700/263; 700/119; 427/8; 427/9; 427/585; 205/82; 205/83; 205/84

(58) Field of Classification Search .................. 700/37, 700/44, 45, 119, 121, 123, 262, 263; 427/8, 427/9, 10, 248.1, 249, 585; 205/82–84
See application file for complete search history.

(56) References Cited

U.S. PATENT DOCUMENTS

| | | |
|---|---|---|
| 1,526,644 A | 2/1925 | Pinney |
| 1,881,713 A | 10/1932 | Laukel |
| 2,256,274 A | 9/1941 | Boedecker et al. |
| 3,309,263 A | 3/1967 | Grobe |
| 3,616,284 A | 10/1971 | Bodmer et al. |

(Continued)

FOREIGN PATENT DOCUMENTS

| | | |
|---|---|---|
| CA | 873651 | 6/1971 |

(Continued)

OTHER PUBLICATIONS

Ritter et al., "Two- And Three- Dimensional Numberical Modeling of Copper Electroplating For Advanced ULSI Metallization", E-MRS Conference, Symposium M, *Basic Models to Enhance Reliability*, Strasbourg (France), 1999.

(Continued)

*Primary Examiner*—Ramesh Patel
(74) *Attorney, Agent, or Firm*—Perkins Coie LLP

(57) ABSTRACT

A facility for selecting and refining electrical parameters for processing a microelectronic workpiece in a processing chamber is described. The facility initially configures the electrical parameters in accordance with either a numerical of the processing chamber or experimental data derived from operating the actual processing chamber. After a workpiece is processed with the initial parameter configuration, the results are measured and a sensitivity matrix based upon the numerical model of the processing chamber is used to select new parameters that correct for any deficiencies measured in the processing of the first workpiece. These parameters are then used in processing a second workpiece, which may be similarly measured, and the results used to further refine the parameters.

11 Claims, 7 Drawing Sheets

U.S. PATENT DOCUMENTS

| | | |
|---|---|---|
| 3,664,933 A | 5/1972 | Clauss |
| 3,706,635 A | 12/1972 | Kowalski |
| 3,706,651 A | 12/1972 | Leland |
| 3,716,462 A | 2/1973 | Jensen |
| 3,798,003 A | 3/1974 | Ensley et al. |
| 3,878,066 A | 4/1975 | Dettke et al. |
| 3,930,963 A | 1/1976 | Polichette et al. |
| 3,968,885 A | 7/1976 | Hassan et al. |
| 4,000,046 A | 12/1976 | Weaver |
| 4,022,679 A | 5/1977 | Koziol et al. |
| 4,030,015 A | 6/1977 | Herko et al. |
| 4,046,105 A | 9/1977 | Gomez |
| 4,072,557 A | 2/1978 | Schiel |
| 4,082,638 A | 4/1978 | Jumer |
| 4,113,577 A | 9/1978 | Ross et al. |
| 4,134,802 A | 1/1979 | Herr |
| 4,137,867 A | 2/1979 | Aigo |
| 4,165,252 A | 8/1979 | Gibbs |
| 4,170,959 A | 10/1979 | Aigo |
| 4,222,834 A | 9/1980 | Bacon et al. |
| 4,238,310 A | 12/1980 | Eckler et al. |
| 4,246,088 A | 1/1981 | Murphy et al. |
| 4,259,166 A | 3/1981 | Whitehurst |
| 4,287,029 A | 9/1981 | Shimamura |
| 4,304,641 A | 12/1981 | Grandia et al. |
| 4,323,433 A | 4/1982 | Loch |
| 4,341,629 A | 7/1982 | Uhlinger |
| 4,360,410 A | 11/1982 | Fletcher et al. |
| 4,378,283 A | 3/1983 | Seyffert |
| 4,384,930 A | 5/1983 | Eckles |
| 4,391,694 A | 7/1983 | Runsten |
| 4,422,915 A | 12/1983 | Wielonski et al. |
| 4,431,361 A | 2/1984 | Bayne |
| 4,437,943 A | 3/1984 | Beck |
| 4,440,597 A | 4/1984 | Wells et al. |
| 4,443,117 A | 4/1984 | Muramoto et al. |
| 4,449,885 A | 5/1984 | Hertel et al. |
| 4,451,197 A | 5/1984 | Lange |
| 4,463,503 A | 8/1984 | Applegate |
| 4,466,864 A | 8/1984 | Bacon |
| 4,469,566 A | 9/1984 | Wray |
| 4,475,823 A | 10/1984 | Stone |
| 4,480,028 A | 10/1984 | Kato et al. |
| 4,495,153 A | 1/1985 | Midorikawa |
| 4,495,453 A | 1/1985 | Inaba |
| 4,500,394 A | 2/1985 | Rizzo |
| 4,529,480 A | 7/1985 | Trokhan |
| 4,541,895 A | 9/1985 | Albert |
| 4,566,847 A | 1/1986 | Maeda |
| 4,576,685 A | 3/1986 | Goffredo et al. |
| 4,576,689 A | 3/1986 | Makkaev |
| 4,585,539 A | 4/1986 | Edson |
| 4,604,177 A | 8/1986 | Sivilotti |
| 4,604,178 A | 8/1986 | Fiegener |
| 4,634,503 A | 1/1987 | Nogavich |
| 4,639,028 A | 1/1987 | Olson |
| 4,648,944 A | 3/1987 | George et al. |
| 4,670,126 A | 6/1987 | Messer et al. |
| 4,685,414 A | 8/1987 | DiRico |
| 4,687,552 A | 8/1987 | Early et al. |
| 4,693,017 A | 9/1987 | Oehler et al. |
| 4,696,729 A | 9/1987 | Santini |
| 4,715,934 A | 12/1987 | Tamminen |
| 4,741,624 A | 5/1988 | Barroyer |
| 4,760,671 A | 8/1988 | Ward |
| 4,761,214 A | 8/1988 | Hinman |
| 4,770,590 A | 9/1988 | Hugues et al. |
| 4,781,800 A | 11/1988 | Goldman |
| 4,800,818 A | 1/1989 | Kawaguchi et al. |
| 4,828,654 A | 5/1989 | Reed |
| 4,849,054 A | 7/1989 | Klowak |
| 4,858,539 A | 8/1989 | Schumann |
| 4,864,239 A | 9/1989 | Casarcia et al. |
| 4,868,992 A | 9/1989 | Crafts et al. |
| 4,898,647 A | 2/1990 | Luce et al. |
| 4,902,398 A | 2/1990 | Homstad |
| 4,906,341 A | 3/1990 | Yamakawa |
| 4,913,085 A | 4/1990 | Vohringer et al. |
| 4,924,890 A | 5/1990 | Giles et al. |
| 4,944,650 A | 7/1990 | Matsumoto |
| 4,949,671 A | 8/1990 | Davis et al. |
| 4,951,601 A | 8/1990 | Maydan et al. |
| 4,959,278 A | 9/1990 | Shimauch |
| 4,962,726 A | 10/1990 | Matsushita et al. |
| 4,979,464 A | 12/1990 | Kunze-Concewitz et al. |
| 4,988,533 A | 1/1991 | Freeman et al. |
| 5,000,827 A | 3/1991 | Schuster |
| 5,024,746 A | 6/1991 | Stierman et al. |
| 5,026,239 A | 6/1991 | Chiba |
| 5,048,589 A | 9/1991 | Cook et al. |
| 5,054,988 A | 10/1991 | Shiraiwa |
| 5,055,036 A | 10/1991 | Asano et al. |
| 5,061,144 A | 10/1991 | Akimoto |
| 5,069,548 A | 12/1991 | Boehnlein |
| 5,078,852 A | 1/1992 | Yee |
| 5,083,364 A | 1/1992 | Olbrich et al. |
| 5,096,550 A | 3/1992 | Mayer |
| 5,110,248 A | 5/1992 | Asano et al. |
| 5,115,430 A | 5/1992 | Hahne |
| 5,125,784 A | 6/1992 | Asano |
| 5,128,912 A | 7/1992 | Hug et al. |
| 5,135,636 A | 8/1992 | Yee et al. |
| 5,138,973 A | 8/1992 | Davis et al. |
| 5,146,136 A | 9/1992 | Ogura |
| 5,151,168 A | 9/1992 | Gilton |
| 5,155,336 A | 10/1992 | Gronet et al. |
| 5,156,174 A | 10/1992 | Thompson |
| 5,156,730 A | 10/1992 | Bhatt |
| 5,168,886 A | 12/1992 | Thompson et al. |
| 5,168,887 A | 12/1992 | Thompson |
| 5,169,408 A | 12/1992 | Biggerstaff et al. |
| 5,172,803 A | 12/1992 | Lewin |
| 5,174,045 A | 12/1992 | Thompson et al. |
| 5,178,512 A | 1/1993 | Skrobak |
| 5,178,639 A | 1/1993 | Nishi |
| 5,180,273 A | 1/1993 | Salaya et al. |
| 5,183,377 A | 2/1993 | Becker et al. |
| 5,186,594 A | 2/1993 | Toshima et al. |
| 5,209,817 A | 5/1993 | Ahmad |
| 5,217,586 A | 6/1993 | Datta |
| 5,222,310 A | 6/1993 | Thompson |
| 5,227,041 A | 7/1993 | Brogden |
| 5,228,232 A | 7/1993 | Miles |
| 5,228,966 A | 7/1993 | Murata |
| 5,230,371 A | 7/1993 | Lee |
| 5,232,511 A | 8/1993 | Bergman |
| 5,235,995 A | 8/1993 | Bergman et al. |
| 5,238,500 A | 8/1993 | Bergman |
| 5,252,137 A | 10/1993 | Tateyama et al. |
| 5,252,807 A | 10/1993 | Chizinsky |
| 5,256,262 A | 10/1993 | Blomsterberg |
| 5,256,274 A | 10/1993 | Poris |
| 5,271,953 A | 12/1993 | Litteral |
| 5,271,972 A | 12/1993 | Kwok et al. |
| 5,301,700 A | 4/1994 | Kamikawa et al. |
| 5,302,464 A | 4/1994 | Nomura |
| 5,306,895 A | 4/1994 | Ushikoshi et al. |
| 5,314,294 A | 5/1994 | Taniguchi |
| 5,316,642 A | 5/1994 | Young |
| 5,326,455 A | 7/1994 | Kubo et al. |
| 5,330,604 A | 7/1994 | Allum et al. |
| 5,332,271 A | 7/1994 | Grant et al. |
| 5,332,445 A | 7/1994 | Bergman |
| 5,340,456 A | 8/1994 | Mehler |

| | | | | | | |
|---|---|---|---|---|---|---|
| 5,344,491 A | 9/1994 | Katou | | 5,731,678 A | 3/1998 | Zila et al. |
| 5,348,620 A | 9/1994 | Hermans et al. | | 5,744,019 A | 4/1998 | Ang |
| 5,364,504 A | 11/1994 | Smurkoski et al. | | 5,746,565 A | 5/1998 | Tepolt |
| 5,366,785 A | 11/1994 | Sawdai | | 5,747,098 A | 5/1998 | Larson |
| 5,366,786 A | 11/1994 | Connor et al. | | 5,754,842 A | 5/1998 | Minagawa |
| 5,368,711 A | 11/1994 | Poris | | 5,755,948 A | 5/1998 | Lazaro et al. |
| 5,368,715 A | 11/1994 | Hurley et al. | | 5,759,006 A | 6/1998 | Miyamoto et al. |
| 5,372,848 A | 12/1994 | Blackwell | | 5,762,751 A | 6/1998 | Bleck |
| 5,376,176 A | 12/1994 | Kuriyama | | 5,765,444 A | 6/1998 | Bacchi |
| 5,377,708 A | 1/1995 | Bergman | | 5,765,889 A | 6/1998 | Nam et al. |
| 5,388,945 A | 2/1995 | Garric et al. | | 5,776,327 A | 7/1998 | Botts et al. |
| 5,391,285 A | 2/1995 | Lytle | | 5,785,826 A | 7/1998 | Greenspan |
| 5,391,517 A | 2/1995 | Gelatos et al. | | 5,788,829 A | 8/1998 | Joshi et al. |
| 5,405,518 A | 4/1995 | Hsieh et al. | | 5,802,856 A | 9/1998 | Schaper et al. |
| 5,411,076 A | 5/1995 | Matsunaga et al. | | 5,829,791 A | 11/1998 | Kotsubo et al. |
| 5,421,987 A | 6/1995 | Tzanavaras et al. | | 5,843,296 A | 12/1998 | Greespan |
| 5,427,674 A | 6/1995 | Langenskiold et al. | | 5,871,626 A | 2/1999 | Crafts |
| 5,429,686 A | 7/1995 | Chiu et al. | | 5,871,805 A * | 2/1999 | Lemelson ............... 427/8 |
| 5,429,733 A | 7/1995 | Ishida | | 5,882,498 A | 3/1999 | Dubin |
| 5,431,803 A | 7/1995 | DiFranco et al. | | 5,892,207 A | 4/1999 | Kawamura et al. |
| 5,437,777 A | 8/1995 | Kishi | | 5,904,827 A | 5/1999 | Reynolds |
| 5,441,629 A | 8/1995 | Kosaki | | 5,908,543 A | 6/1999 | Matsunami |
| 5,442,416 A | 8/1995 | Tateyama et al. | | 5,925,227 A | 7/1999 | Kobayashi et al. |
| 5,443,707 A | 8/1995 | Mori | | 5,932,077 A | 8/1999 | Reynolds |
| 5,445,484 A | 8/1995 | Kato et al. | | 5,937,142 A | 8/1999 | Moslehi et al. |
| 5,447,615 A | 9/1995 | Ishida | | 5,957,836 A | 9/1999 | Johnson |
| 5,454,405 A | 10/1995 | Hawes | | 5,980,706 A | 11/1999 | Bleck |
| 5,460,478 A | 10/1995 | Akimoto et al. | | 5,985,126 A | 11/1999 | Bleck |
| 5,464,313 A | 11/1995 | Ohsawa | | 5,989,397 A | 11/1999 | Laube et al. |
| 5,472,502 A | 12/1995 | Batchelder | | 5,989,406 A | 11/1999 | Beetz |
| 5,489,341 A | 2/1996 | Bergman et al. | | 5,998,123 A | 12/1999 | Tanaka et al. |
| 5,500,081 A | 3/1996 | Bergman | | 5,999,886 A | 12/1999 | Martin et al. |
| 5,501,768 A | 3/1996 | Hermans et al. | | 6,001,235 A | 12/1999 | Arken et al. |
| 5,508,095 A | 4/1996 | Allum et al. | | 6,004,828 A | 12/1999 | Hanson |
| 5,512,319 A | 4/1996 | Cook et al. | | 6,017,820 A | 1/2000 | Ting et al. |
| 5,514,258 A | 5/1996 | Brinket et al. | | 6,027,631 A | 2/2000 | Broadbent |
| 5,516,412 A | 5/1996 | Andricacos et al. | | 6,028,986 A | 2/2000 | Song |
| 5,522,975 A | 6/1996 | Andricacos et al. | | 6,051,284 A * | 4/2000 | Byrne et al. ............... 427/569 |
| 5,527,390 A | 6/1996 | Ono et al. | | 6,053,687 A | 4/2000 | Kirkpatrick |
| 5,544,421 A | 8/1996 | Thompson et al. | | 6,072,160 A | 6/2000 | Bahl |
| 5,549,808 A | 8/1996 | Farooq | | 6,072,163 A | 6/2000 | Armstrong et al. |
| 5,567,267 A | 10/1996 | Kazama et al. | | 6,074,544 A | 6/2000 | Reid |
| 5,571,325 A | 11/1996 | Ueyama | | 6,080,288 A | 6/2000 | Schwartz et al. |
| 5,575,611 A | 11/1996 | Thompson et al. | | 6,080,291 A | 6/2000 | Woodruff et al. |
| 5,584,310 A | 12/1996 | Bergman | | 6,080,691 A | 6/2000 | Lindsay et al. |
| 5,584,971 A | 12/1996 | Komino | | 6,086,680 A | 7/2000 | Foster et al. |
| 5,593,545 A | 1/1997 | Rugowski et al. | | 6,090,260 A | 7/2000 | Inoue |
| 5,597,460 A | 1/1997 | Reynolds | | 6,091,498 A | 7/2000 | Hanson |
| 5,597,836 A | 1/1997 | Hackler et al. | | 6,099,702 A | 8/2000 | Reid |
| 5,600,532 A | 2/1997 | Michiya et al. | | 6,099,712 A | 8/2000 | Ritzdorf |
| 5,609,239 A | 3/1997 | Schlecker | | 6,103,085 A | 8/2000 | Woo et al. |
| 5,620,581 A | 4/1997 | Ang | | 6,107,192 A | 8/2000 | Subrahmanyan et al. |
| 5,639,206 A | 6/1997 | Oda et al. | | 6,108,937 A | 8/2000 | Raaijmakers |
| 5,639,316 A | 6/1997 | Cabral | | 6,110,011 A | 8/2000 | Somekh |
| 5,641,613 A | 6/1997 | Boff et al. | | 6,110,345 A | 8/2000 | Iacoponi |
| 5,650,082 A | 7/1997 | Anderson | | 6,110,346 A | 8/2000 | Reid |
| 5,651,823 A | 7/1997 | Parodi et al. | | 6,130,415 A | 10/2000 | Knoot |
| 5,658,387 A | 8/1997 | Reardon | | 6,136,163 A | 10/2000 | Cheung |
| 5,660,472 A | 8/1997 | Peuse et al. | | 6,139,703 A | 10/2000 | Hanson et al. |
| 5,660,517 A | 8/1997 | Thompson et al. | | 6,139,712 A | 10/2000 | Patton |
| 5,662,788 A | 9/1997 | Sandhu | | 6,140,234 A | 10/2000 | Uzoh et al. |
| 5,664,337 A | 9/1997 | Davis et al. | | 6,143,147 A | 11/2000 | Jelinek |
| 5,670,034 A | 9/1997 | Lowery | | 6,143,155 A | 11/2000 | Adams |
| 5,676,337 A | 10/1997 | Giras et al. | | 6,151,532 A | 11/2000 | Barone et al. |
| 5,677,118 A | 10/1997 | Spara et al. | | 6,156,167 A | 12/2000 | Patton |
| 5,678,320 A | 10/1997 | Thompson et al. | | 6,157,106 A | 12/2000 | Tietz et al. |
| 5,681,392 A | 10/1997 | Swain | | 6,159,354 A | 12/2000 | Contolini |
| 5,683,564 A | 11/1997 | Reynolds | | 6,162,344 A | 12/2000 | Reid |
| 5,684,654 A | 11/1997 | Searle et al. | | 6,162,488 A | 12/2000 | Gevelber et al. |
| 5,684,713 A | 11/1997 | Asada et al. | | 6,168,695 B1 | 1/2001 | Woodruff |
| 5,700,127 A | 12/1997 | Harada | | 6,174,425 B1 | 1/2001 | Simpson |
| 5,711,646 A | 1/1998 | Ueda et al. | | 6,174,796 B1 | 1/2001 | Takagi et al. |
| 5,723,028 A | 3/1998 | Poris | | 6,179,983 B1 | 1/2001 | Reid |

| | | | | | | |
|---|---|---|---|---|---|---|
| 6,184,068 B1 | 2/2001 | Ohtani et al. | EP | 0047132 B1 | 7/1985 | |
| 6,193,859 B1 | 2/2001 | Contolini | EP | 0 677 612 A3 | 10/1985 | |
| 6,199,301 B1 | 3/2001 | Wallace | EP | 0 257 670 | 3/1988 | |
| 6,218,097 B1 | 4/2001 | Bell et al. | EP | 0 290 210 | 11/1988 | |
| 6,221,230 B1 | 4/2001 | Takeuchi | EP | 0290210 | 11/1988 | |
| 6,228,232 B1 | 5/2001 | Woodruff | EP | 0 677 612 A2 | 10/1995 | |
| 6,234,738 B1 | 5/2001 | Kimata | EP | 0582019 B1 | 10/1995 | |
| 6,251,238 B1 | 6/2001 | Kaufman et al. | EP | 0544311 B1 | 5/1996 | |
| 6,251,528 B1 | 6/2001 | Uzoh et al. | EP | 0 881 673 A2 | 5/1998 | |
| 6,254,742 B1 | 7/2001 | Hanson et al. | EP | 0 982 771 A1 | 8/1999 | |
| 6,258,220 B1 | 7/2001 | Dordi | EP | 1 069 213 A2 | 7/2000 | |
| 6,261,433 B1 | 7/2001 | Landau | EP | 0452939 B1 | 11/2000 | |
| 6,270,647 B1 | 8/2001 | Graham | GB | 2217107 A | 3/1989 | |
| 6,277,263 B1 | 8/2001 | Chen | GB | 2 254 288 A | 3/1992 | |
| 6,278,089 B1 | 8/2001 | Young et al. | GB | 2 279 372 A | 6/1994 | |
| 6,280,183 B1 | 8/2001 | Mayur et al. | JP | 1048442 | 2/1989 | |
| 6,280,582 B1 | 8/2001 | Woodruff et al. | JP | 4144150 | 5/1992 | |
| 6,280,583 B1 | 8/2001 | Woodruff et al. | JP | 4311591 | 11/1992 | |
| 6,297,154 B1 | 10/2001 | Gross et al. | JP | 5146984 | 6/1993 | |
| 6,303,010 B1 | 10/2001 | Woodruff et al. | JP | 5195183 A | 8/1993 | |
| 6,309,520 B1 | 10/2001 | Woodruff et al. | JP | 5211224 | 8/1993 | |
| 6,309,524 B1 | 10/2001 | Woodruff et al. | JP | 6017291 A | 1/1994 | |
| 6,318,951 B1 | 11/2001 | Schmidt | JP | 6073598 A | 3/1994 | |
| 6,322,112 B1 | 11/2001 | Duncan | JP | 6224202 A | 8/1994 | |
| 6,322,677 B1 | 11/2001 | Woodruff | JP | 7113159 A | 5/1995 | |
| 6,342,137 B1 | 1/2002 | Woodruff | JP | 7197299 A | 8/1995 | |
| 6,365,729 B1 | 4/2002 | Tyagi | JP | 10-083960 | 3/1998 | |
| 6,391,166 B1 | 5/2002 | Wang | JP | 11036096 A | 2/1999 | |
| 6,402,923 B1 | 6/2002 | Mayer | JP | 11080993 A | 3/1999 | |
| 6,409,892 B1 | 6/2002 | Woodruff et al. | WO | WO-90/00476 | 1/1990 | |
| 6,428,660 B1 | 8/2002 | Woodruff et al. | WO | WO-91/04213 | 4/1991 | |
| 6,428,662 B1 | 8/2002 | Woodruff et al. | WO | WO-95/06326 | 3/1995 | |
| 6,444,101 B1 | 9/2002 | Stevens | WO | WO-95/20064 | 7/1995 | |
| 6,471,913 B1 | 10/2002 | Weaver et al. | WO | WO-96/16936 | 4/1996 | |
| 6,481,956 B1 | 11/2002 | Hofmeister | WO | WO-99/15710 | 4/1999 | |
| 6,491,806 B1 | 12/2002 | Dubin | WO | WO-99/25904 | 5/1999 | |
| 6,497,801 B1 | 12/2002 | Woodruff | WO | WO-99/25905 | 5/1999 | |
| 6,562,421 B1 | 5/2003 | Sudo | WO | WO-99/40615 | 8/1999 | |
| 6,565,729 B1 | 5/2003 | Chen | WO | WO-99/41434 | 8/1999 | |
| 6,569,297 B1 | 5/2003 | Wilson | WO | WO-99/45567 | 9/1999 | |
| 6,599,412 B1 | 7/2003 | Graham | WO | WO-99/45745 | 9/1999 | |
| 6,623,609 B1 | 9/2003 | Harris | WO | WO-00/02675 | 1/2000 | |
| 6,632,334 B1 | 10/2003 | Anderson | WO | WO-00/02808 | 1/2000 | |
| 6,660,137 B1 | 12/2003 | Wilson | WO | WO-00/02808 A1 | 1/2000 | |
| 6,678,055 B1* | 1/2004 | Du-Nour et al. ............ 356/504 | WO | WO-00/03072 | 1/2000 | |
| 6,699,373 B1 | 3/2004 | Woodruff | WO | WO-02/02808 | 1/2000 | |
| 6,709,562 B1* | 3/2004 | Andricacos et al. ........ 205/122 | WO | WO-00/32835 | 6/2000 | |
| 6,755,954 B1 | 6/2004 | Mayer et al. | WO | WO-00/61498 | 10/2000 | |
| 6,773,571 B1 | 8/2004 | Mayer et al. | WO | WO-00/61837 | 10/2000 | |
| 2001/0024611 A1 | 9/2001 | Woodruff | WO | WO-01/46910 | 6/2001 | |
| 2001/0032788 A1 | 10/2001 | Woodruff | WO | WO-01/90434 | 11/2001 | |
| 2001/0043856 A1 | 11/2001 | Woodruff | WO | WO-01/91163 | 11/2001 | |
| 2002/0008036 A1 | 1/2002 | Wang | WO | WO-02/17203 | 2/2002 | |
| 2002/0008037 A1 | 1/2002 | Wilson | WO | WO-02/045476 | 6/2002 | |
| 2002/0032499 A1 | 3/2002 | Wilson | WO | WO-03/18874 | 9/2002 | |
| 2002/0046952 A1 | 4/2002 | Graham | WO | WO-02/097165 | 12/2002 | |
| 2002/0079215 A1 | 6/2002 | Wilson et al. | WO | WO-02/97165 | 12/2002 | |
| 2002/0096508 A1 | 7/2002 | Weaver et al. | WO | WO-02/99165 | 12/2002 | |
| 2002/0125141 A1 | 9/2002 | Wilson | WO | WO-02/099165 | 12/2002 | |
| 2002/0139678 A1* | 10/2002 | Wilson et al. ................ 205/96 | | | | |
| 2003/0038035 A1 | 2/2003 | Wilson | | | | |
| 2003/0062258 A1 | 4/2003 | Woodruff | | | | |
| 2003/0070918 A1 | 4/2003 | Hanson | | | | |
| 2003/0127337 A1 | 7/2003 | Hanson | | | | |
| 2004/0031693 A1 | 2/2004 | Chen | | | | |
| 2004/0055877 A1 | 3/2004 | Wilson | | | | |
| 2004/0099533 A1 | 5/2004 | Wilson | | | | |

FOREIGN PATENT DOCUMENTS

| | | |
|---|---|---|
| DE | 41 14 427 | 11/1992 |
| DE | 195 25 666 | 10/1996 |
| EP | 0 140 404 A1 | 8/1984 |

OTHER PUBLICATIONS

Patent Abstract of Japan, "Organic Compound and its Application," Publciation No. 08-003153, Publication Date: Jan. 9, 1996.

Patent Abstract of Japan, English Abstract Translation—Japanese Utility Model No. 2538705, Publication Date: Aug. 25, 1992.

U.S. Appl. No. 09/679,928, Woodruff et al.

U.S. Appl. No. 10/729,349, Klocke.

U.S. Appl. No. 10/729,357, Klocke.

U.S. Appl. No. 10/817,659, Wilson et al.

U.S. Appl. No. 60/129,055, McHugh.
U.S. Appl. No. 60/143,769, McHugh.
U.S. Appl. No. 60/182,160, McHugh et al.
U.S. Appl. No. 60/206,663, Wilson et al.
U.S. Appl. No. 60/294,690, Gibbons et al.
U.S. Appl. No. 60/316,597, Hanson.
U.S. Appl. No. 60/607,046, Klocke.
U.S. Appl. No. 60/607,460, Klocke.
Contolini et al., "Copper Electroplating Process for Sub-Half-Micron ULSI Structures," VMIC Conference 1995 ISMIC—04/95/0322, pp. 322-328, Jun. 17-29, 1995.
Devaraj et al., "Pulsed Electrodeposition of Copper," Plating & Surface Finishing, pp. 72-78, Aug. 1992.
Dubin, "Copper Plating Techniques for ULSI Metallization," Advanced MicroDevices.
Dubin, V.M., "Electrochemical Deposition of Copper for On-Chip Interconnects," Advanced MicroDevices.
Gauvin et al., "The Effect of Chloride Ions on Copper Deposition," J. of Electrochemical Society, vol. 99, pp. 71-75, Feb. 1952.
Lee, Tien-Yu Tom, "Application of a CFD Tool in Designing a Fountain Plating Cell for Uniform Bump Plating of Semiconductor Wafers," IEE Transactions on Components, Packaging, and Manufacturing Technology (Feb. 1996), vol. 19, No. 1, IEEE.
Lowenheim, F.A., "Electroplating," Jan. 1979, 12 pgs, McGraw-Hill Book Company.
Lowenheim, Frederick A., "Electroplating Electrochemistry Applied to Electroplating," 1978, pp 152-155, McGraw-Hill Book Company, New York.
Ossro, N.M., "An Overview of Pulse Plating," Plating and Surface Finishing, Mar. 1986.
Passal, F., "Copper Plating During the Last Fifty Years," Plating, pp. 628-638, Jun. 1959.
Patent Abstract of Japan, "Partial Plating Device," Publciation No. 01234590, Publication Date: Sep. 19, 1989.
Patent Abstract of Japan, "Plating Method" Publication No. 57171690, Publication Date: Oct. 22, 1982.
Singer, P., "Copper Goes Mainstream: Low k to Follow," Semiconductor International, pp. 67-70, Nov. 1997.
International Search Report for PCT/US01/14509, Applicant: Semitool, Inc., Apr. 28, 2005, 6 pages.

* cited by examiner ic roelectronic workpieces. For example, electroplating is
TUNING ELECTRODES USED IN A REACTOR FOR ELECTROCHEMICALLY PROCESSING A MICROELECTRONIC WORKPIECE

CROSS-REFERENCES TO RELATED APPLICATIONS

The present application claims the benefit of U.S. Provisional Patent Application No. 60/206,663, filed May 24, 2000, and is a continuation-in-part of International Patent Application No. PCT/US00/10120, filed Apr. 13, 2000, designating the United States and claiming the benefit of U.S. Provisional Patent Application Nos. 60/182,160, filed Feb. 14, 2000; 60/143,769, filed Jul. 12, 1999; and 60/129,055, filed Apr. 13, 1999, the disclosures of each of which are hereby expressly incorporated by reference in their entireties.

FIELD OF THE INVENTION

The present invention is directed to the field of automatic process control, and, more particularly, to the field of controlling a material deposition process.

BACKGROUND OF THE INVENTION

The fabrication of microelectronic components from a microelectronic workpiece, such as a semiconductor wafer substrate, polymer substrate, etc., involves a substantial number of processes. For purposes of the present application, a microelectronic workpiece is defined to include a workpiece formed from a substrate upon which microelectronic circuits or components, data storage elements or layers, and/or micro-mechanical elements are formed. There are a number of different processing operations performed on the microelectronic workpiece to fabricate the microelectronic component(s). Such operations include, for example, material deposition, patterning, doping, chemical mechanical polishing, electropolishing, and heat treatment.

Material deposition processing involves depositing or otherwise forming thin layers of material on the surface of the microelectronic workpiece. Patterning provides selective deposition of a thin layer and/or removal of selected portions of these added layers. Doping of the semiconductor wafer, or similar microelectronic workpiece, is the process of adding impurities known as "dopants" to selected portions of the wafer to alter the electrical characteristics of the substrate material. Heat treatment of the microelectronic workpiece involves heating and/or cooling the workpiece to achieve specific process results. Chemical mechanical polishing involves the removal of material through a combined chemical/mechanical process while electropolishing involves the removal of material from a workpiece surface using electrochemical reactions.

Numerous processing devices, known as processing "tools," have been developed to implement one or more of the foregoing processing operations. These tools take on different configurations depending on the type of workpiece used in the fabrication process and the process or processes executed by the tool. One tool configuration, known as the LT-210C™ processing tool and available from Semitool, Inc., of Kalispell, Mont., includes a plurality of microelectronic workpiece processing stations that are serviced by one or more workpiece transfer robots. Several of the workpiece processing stations utilize a workpiece holder and a process bowl or container for implementing wet processing operations. Such wet processing operations include electroplating, etching, cleaning, electroless deposition, electropolishing, etc. In connection with the present invention, it is the electrochemical processing stations used in the LT-210C™ that are noteworthy. Such electrochemical processing stations perform the foregoing electroplating, electropolishing, anodization, etc., of the microelectronic workpiece. It will be recognized that the electrochemical processing system set forth herein is readily adapted to implement each of the foregoing electrochemical processes.

In accordance with one configuration of the LT-210C™ tool, the electrochemical processing stations include a workpiece holder and a process container that are disposed proximate one another. The workpiece holder and process container are operated to bring the microelectronic workpiece held by the workpiece holder into contact with an electrochemical processing fluid disposed in the process container. When the microelectronic workpiece is positioned in this manner, the workpiece holder and process container form a processing chamber that may be open, enclosed, or substantially enclosed.

Electroplating and other electrochemical processes have become important in the production of semiconductor integrated circuits and other microelectronic devices from microelectronic workpieces. For example, electroplating is often used in the formation of one or more metal layers on the workpiece. These metal layers are often used to electrically interconnect the various devices of the integrated circuit. Further, the structures formed from the metal layers may constitute microelectronic devices such as read/write heads, etc.

Electroplated metals typically include copper, nickel, gold, platinum, solder, nickel-iron, etc. Electroplating is generally effected by initial formation of a seed layer on the microelectronic workpiece in the form of a very thin layer of metal, whereby the surface of the microelectronic workpiece is rendered electrically conductive. This electro-conductivity permits subsequent formation of a blanket or patterned layer of the desired metal by electroplating. Subsequent processing, such as chemical mechanical planarization, may be used to remove unwanted portions of the patterned or metal blanket layer formed during electroplating, resulting in the formation of the desired metallized structure.

Electropolishing of metals at the surface of a workpiece involves the removal of at least some of the metal using an electrochemical process. The electrochemical process is effectively the reverse of the electroplating reaction and is often carried out using the same or similar reactors as electroplating.

Anodization typically involves oxidizing a thin-film layer at the surface of the workpiece. For example, it may be desirable to selectively oxidize certain portions of a metal layer, such as a Cu layer, to facilitate subsequent removal of the selected portions in a solution that etches the oxidized material faster than the non-oxidized material. Further, anodization may be used to deposit certain materials, such as perovskite materials, onto the surface of the workpiece.

As the size of various microelectronic circuits and components decreases, there is a corresponding decrease in the manufacturing tolerances that must be met by the manufacturing tools. In connection with the present invention as described below, electrochemical processes must uniformly process the surface of a given microelectronic workpiece. Further, the electrochemical process must meet workpiece-to-workpiece uniformity requirements.

To meet such uniformity requirements, an array of multiple electrodes may be used as the anode or cathode for a given electrochemical process. In each of these electrode arrays, a plurality of electrodes are arranged in a generally optimized pattern corresponding to the shape of the particular microelectronic workpiece that is to be processed. Each of the electrodes is connected to an electrical power supply that provides the electrical power used to execute the electrochemical processing operations. Preferably, at least some of the electrodes are connected to different electrical nodes so lo that the electrical power provided to them by the power supply may be provided independent of the electrical power provided to other electrodes in the array.

Electrode arrays having a plurality of electrodes facilitate localized control of the electrical parameters used to electrochemically process the microelectronic workpiece. This localized control of the electrical parameters can be used to provide greater uniformity of the electrochemical processing across the surface of the microelectronic workpiece when compared to single electrode systems. However, determining the electrical parameters for each of the electrodes in the array to achieve the desired process uniformity can be problematic. Typically, the electrical parameter (i.e., electrical current, voltage, etc.) for a given electrode in a given electrochemical process is determined experimentally using a manual trial and error approach. Using such a manual trial and error approach, however, can be very time-consuming. Further, the electrical parameters do not easily translate to other electrochemical processes. For example, a given set of electrical parameters used to electroplate a metal to a thickness X onto the surface of a microelectronic workpiece cannot easily be used to derive the electrical parameters used to electroplate a metal to a thickness Y. Still further, the electrical parameters used to electroplate a desired film thickness X of a given metal (e.g., copper) are generally not suitable for use in electroplating another metal (e.g., platinum). Similar deficiencies in this trial and error approach are associated with other types of electrochemical processes (i.e., anodization, electropolishing, etc.). Also, this manual trial and error approach often must be repeated in several common circumstances, such as when the thickness or level of uniformity of the seed layer changes, when the target plating thickness or profile changes, or when the plating rate changes.

In view of the foregoing, a system for electrochemically processing a microelectronic workpiece that can be used to readily identify electrical parameters that cause a multiple electrode array to achieve a high level of uniformity for a wide range of electrochemical processing variables (e.g., seed layer thicknesses, seed layer types, electroplating materials, etc.) would have significant utility.

DETAILED DESCRIPTION

A facility for automatically selecting and refining electrical parameters for processing a microelectronic workpiece ("the optimizer") is disclosed. In some embodiments, the optimizer adjusts the anode currents for a multiple anode electroplating chamber, such as the Semitool CFD-2 chamber, in order to achieve a specified thickness profile (i. e., flat, convex, concave, etc.). The optimizer adjusts anode currents to compensate for changes in the incoming seed layer (feed forward), and to correct for prior wafer non-uniformities (feedback).

The facility typically operates an electroplating chamber containing a principal fluid flow chamber, and a plurality of electrodes disposed in the principal fluid flow chamber. The electroplating chamber typically further contains a workpiece holder positioned to hold at least one surface of the microelectronic workpiece in contact with an electrochemical processing fluid in the principal fluid flow chamber, at least during electrochemical processing of the microelectronic workpiece. One or more electrical contacts are configured to contact the at least one surface of the microelectronic workpiece, and an electrical power supply is connected to the one or more electrical contacts and to the plurality of electrodes. At least two of the plurality of electrodes are independently connected to the electrical power supply to facilitate independent supply of power thereto. The apparatus also includes a control system that is connected to the electrical power supply to control at least one electrical power parameter respectively associated with each of the independently connected electrodes. The control system sets the at least one electrical power parameter for a given one of the independently connected electrodes based on one or more user input parameters and a plurality of predetermined sensitivity values; wherein the sensitivity values correspond to process perturbations resulting from perturbations of the electrical power parameter for the given one of the independently connected electrodes.

For example, although the present invention is described in the context of electrochemical processing of the microelectronic workpiece, the teachings herein can also be extended to other types of microelectronic workpiece processing. In effect, the teachings herein can be extended to other microelectronic workpiece processing systems that have individually controlled processing elements that are responsive to control parameters and that have interdependent effects on a physical characteristic of the microelectronic workpiece that is processed using the elements. Such systems may employ sensitivity tables/matrices as set forth herein and use them in calculations with one or more input parameters sets to arrive at control parameter values that accurately result in the targeted physical characteristic of the microelectronic workpiece.

Figure 1:
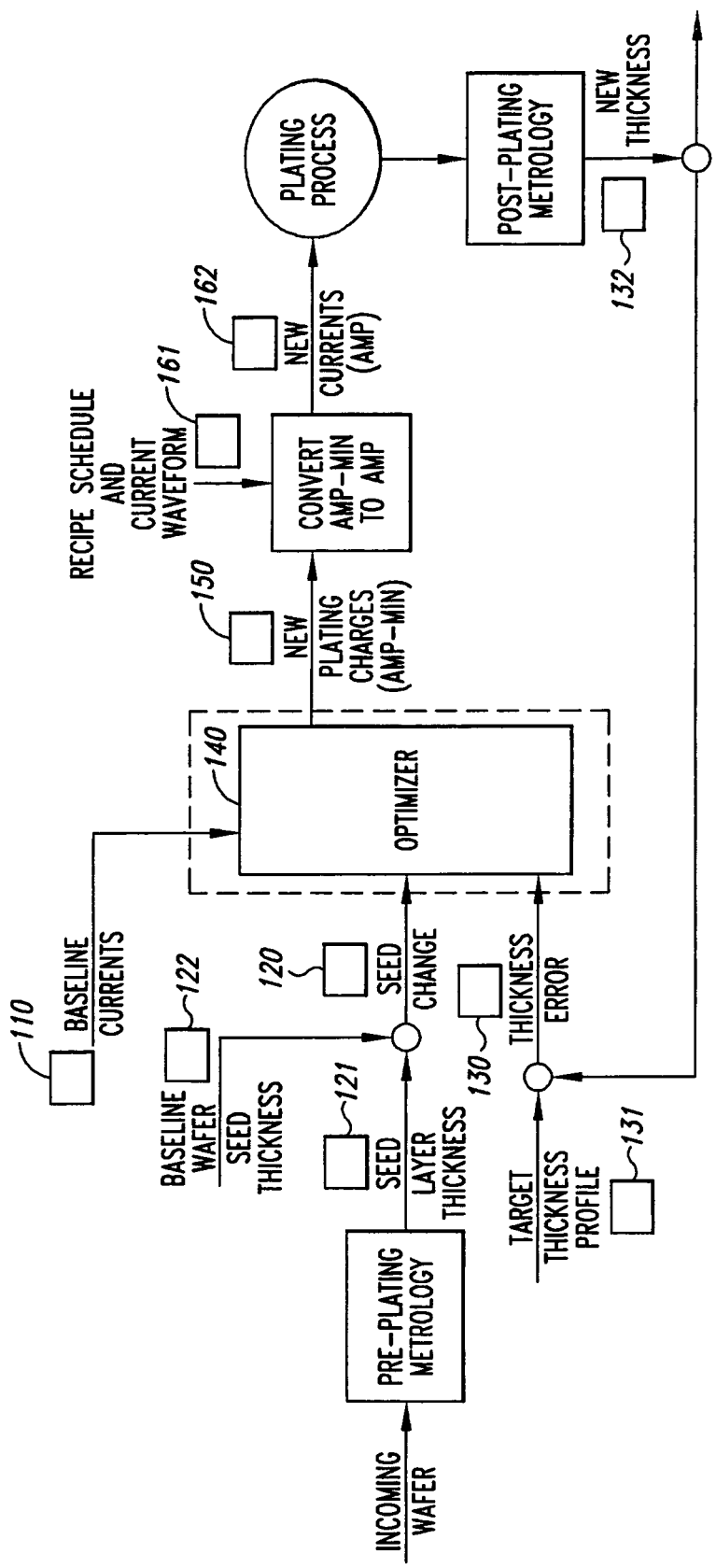
FIG. 1 is a process schematic diagram showing inputs and outputs of the optimizer.

FIG. 1 is a process schematic diagram showing inputs and outputs of the optimizer. FIG. 1 shows that the optimizer 140 uses up to three sources of input: baseline currents 110, seed change 120, and thickness error 130. The baseline currents 110 are the anode currents used to plate the previous wafer or those utilized in a mathematical model of the chamber. The seed change 120 is the difference between the thickness of the seed layer of the incoming wafer 121 and the thickness of the seed layer of either the baseline incorporated in the mathematical model or the previous wafer actually plated 122. The seed change input 120 is said to be a source of feed-forward control in the optimizer, in that it incorporates information about the upcoming plating cycle, as it reflects the measurement the wafer to be plated in the upcoming plating cycle. Thickness error 130 is the difference in thickness between either the previous plated wafer 132 or the baseline thickness incorporated in the mathematical model and the target thickness profile 131 specified for the upcoming plating cycle. The thickness error 130 is said to be a source of feedback control, because it incorporates information from an earlier plating cycle, that is, the thickness of the wafer plated in the previous plating cycle.

FIG. 1 further shows that the optimizer outputs new currents 150 for the -upcoming plating cycle in amp-minutes units. The new currents output is combined with a current wave form 161 to convert its units from amp-minutes to amps 160. The new currents in amps 160 is used by the plating process to plate a wafer in the next plating cycle. The wafer so plated is then subjected to post-plating metrology to measure its plated thickness 132.

While the optimizer is shown as receiving inputs and producing outputs at various points in the processing of these values, it will be understood by those in the art that the optimizer may be variously defined to include or exclude aspects of such processing. For example, while FIG. 1 shows the generation of seed change from baseline wafer seed thickness and seed layer thickness outside the optimizer, it is contemplated that such generation may alternatively be performed within the optimizer.

Figure 2:
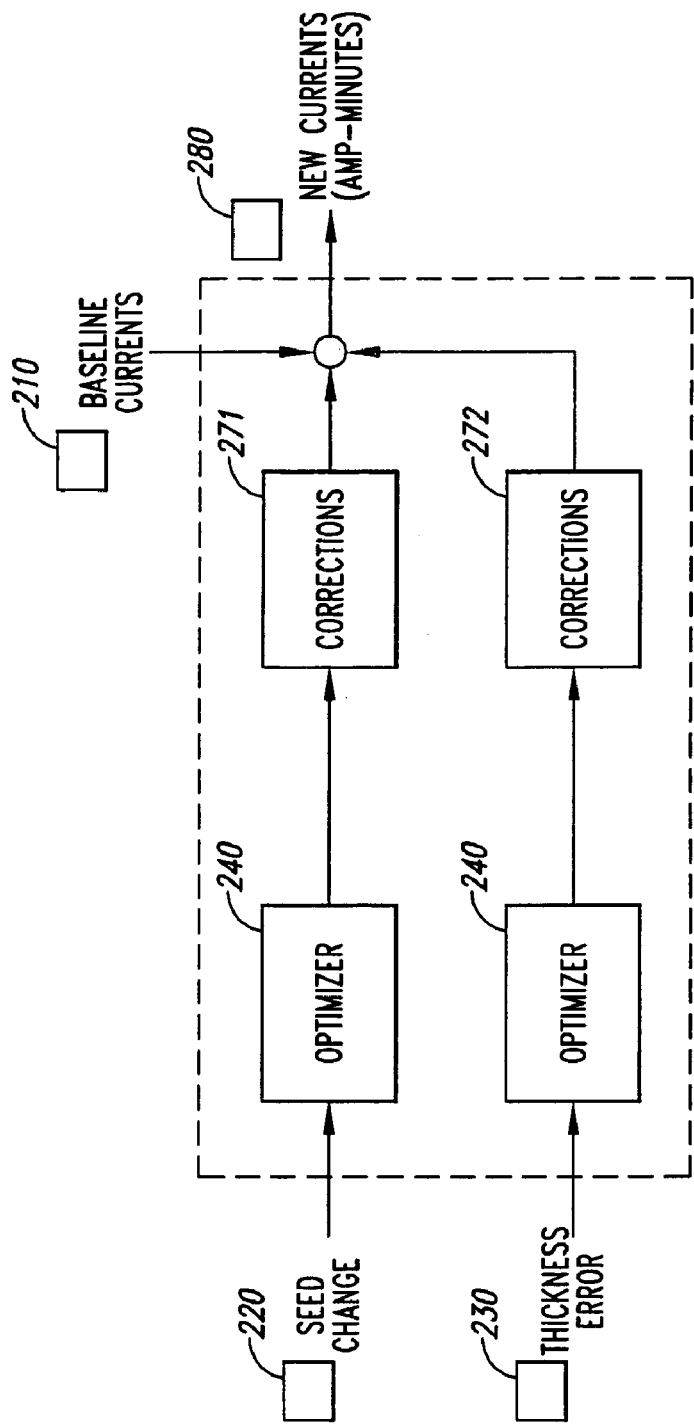
FIG. 2 is a process schematic diagram showing a branch correction system utilized by some embodiments of the optimizer.

FIG. 2 is a process schematic diagram showing a branch correction system utilized by some embodiments of the optimizer. The branched adjustment system utilizes two independently-engageable correction adjustments, a feedback adjustment (220, 240, 271) due to thickness errors and a feed forward adjustment (230, 240, 272) due to incoming seed layer thickness variation. When the anode currents produce an acceptable uniformity, the feedback loop may be disengaged from the transformation of baseline currents 210 to new currents 250. The feed forward compensation may be disengaged in situations where the seed layer variations are not expected to affect thickness uniformity. For example, after the first wafer of a similar batch is corrected for, the feed-forward compensation may be disengaged and the corrections may be applied to each sequential wafer in the batch.

During chamber setup, chamber-to-chamber current adjustments are made that compensate for chamber-to-chamber manufacturing tolerances, setup, power supply, etc. First, a recipe is defined that contains nominal current settings specifically designed to standardize the chamber setup is used. The seed layer of a wafer is measured and then processed using the standard recipe. The outgoing plated wafer is then measured, providing the optimizer with the necessary data to compute chamber specific corrections. The process iterates until the results are within some tolerance. This procedure is then repeated for each plating chamber. A comparison of the final currents between all chambers and the standard recipe currents then yields an offset table for each chamber.

During production runs, the seed layer of the incoming wafer is measured and the optimizer is used to calculate the correction for that seed layer relative to a set of baseline currents. The chamber specific correction is automatically applied to the process. The feedback loop may be omitted in this case if all wafers are not measured after plating. Consequently, when a wafer is being processed, the recipe will be adjusted for the seed layer correction and the chamber specific correction.

Figure 3:
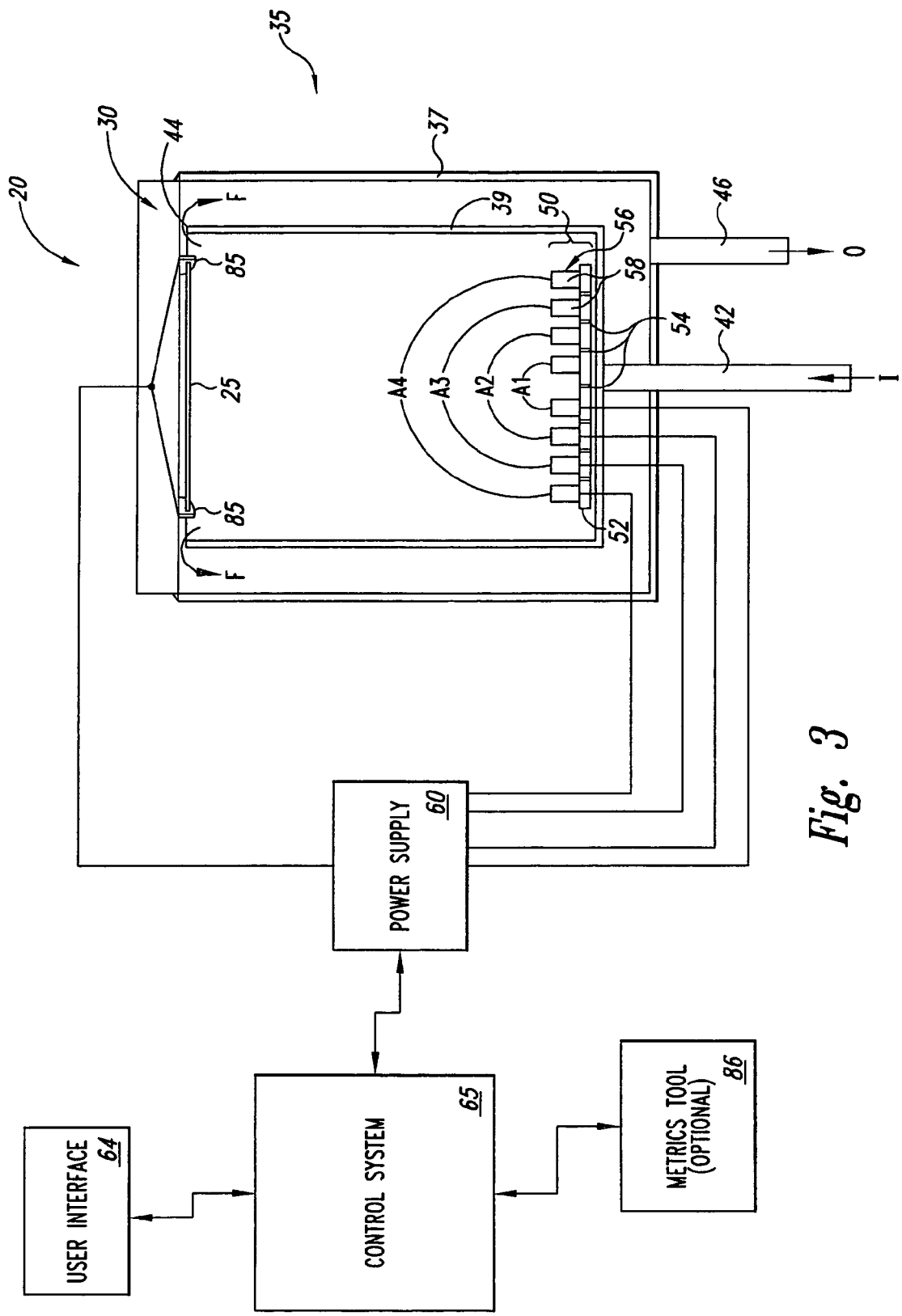
FIG. 3 is schematic block diagram of an electrochemical processing system constructed in accordance with one embodiment of the optimizer.

FIG. 3 is schematic block diagram of an electrochemical processing system constructed in accordance with one embodiment of the optimizer. FIG. 3 shows a reactor assembly 20 for electrochemically processing a microelectronic workpiece 25, such as a semiconductor wafer, that can be used in connection with the present invention. Generally stated, an embodiment of the reactor assembly 20 includes a reactor head 30 and a corresponding reactor base or container shown generally at 35. The reactor base 35 can be a bowl and cup assembly for containing a flow of an electrochemical processing solution. The reactor 20 of FIG. 3 can be used to implement a variety of electrochemical processing operations such as electroplating, electropolishing, anodization, etc., as well as to implement a wide variety of other material deposition techniques. For purposes of the following discussion, aspects of the specific embodiment set forth herein will be described, without limitation, in the context of an electroplating process.

The reactor head 30 of the reactor assembly 20 can include a stationary assembly (not shown) and a rotor assembly (not shown). The rotor assembly may be 5 configured to receive and carry an associated microelectronic workpiece 25, position the microelectronic workpiece in a process-side down orientation within reactor container 35, and to rotate or spin the workpiece. The reactor head 30 can also include one or more contacts 85 (shown schematically) that provide electroplating power to the surface of the microelectronic workpiece. In the illustrated embodiment, the contacts 85 are configured lo to contact a seed layer or other conductive material that is to be plated on the plating surface microelectronic workpiece 25. It will be recognized, however, that the contacts 85 can engage either the front side or the backside of the workpiece depending upon the appropriate conductive path between the contacts and the area that is to be plated. Suitable reactor heads 30 with contacts 85 are disclosed in U.S. Pat. No. 6,080,291 and U.S. application Ser. Nos. 09/386,803; 09/386,610; 09/386,197; 09/717,927; and 09/823,948, all of which are expressly incorporated herein in their entirety by reference.

The reactor head 30 can be carried by a lift/rotate apparatus that rotates the reactor head 30 from an upwardly-facing orientation in which it can receive the microelectronic workpiece to a downwardly facing orientation in which the plating surface of the microelectronic workpiece can contact the electroplating solution in reactor base 35. The lift/rotate apparatus can bring the workpiece 25 into contact with the electroplating solution either coplanar or at a given angle. A robotic system, which can include an end effector, is typically employed for loading/unloading the microelectronic workpiece 25 on the head 30. It will be recognized that other reactor assembly configurations may be used with the inventive aspects of the disclosed reactor chamber, the foregoing being merely illustrative.

The reactor base 35 can include an outer overflow container 37 and an interior processing container 39. A flow of electroplating fluid flows into the processing container 39 through an inlet 42 (arrow I). The electroplating fluid flows through the 30 interior of the processing container 39 and overflows a weir 44 at the top of processing container 39 (arrow F). The fluid overflowing the weir 44 then passes through an overflow container 37 and exits the reactor 20 through an outlet 46 (arrow O). The fluid exiting the outlet 46 may be directed to a recirculation system, chemical replenishment system, disposal system, etc.

The reactor 30 also includes an electrode in the processing container 39 to contact the electrochemical processing fluid (e.g., the electroplating fluid) as it flows through the reactor 30. In the embodiment of FIG. 3, the reactor 30 includes an electrode assembly 50 having a base member 52 through which a plurality of fluid flow apertures 54 extend. The fluid flow apertures 54 assist in disbursing the electroplating fluid flow entering inlet 42 so that the flow of electroplating fluid at the surface of microelectronic workpiece 25 is less localized and has a desired radial distribution. The electrode assembly 50 also includes an electrode array 56 that can comprise a plurality of individual electrodes 58 supported by the base member 52. The electrode array 56 can have several configurations, including those in which electrodes are disposed at different distances from the microelectronic workpiece. The particular physical configuration that is utilized in a given reactor can depend on the particular type and shape of the microelectronic workpiece 25. In the illustrated embodiment, the microelectronic workpiece 25 is a disk-shaped semiconductor wafer. Accordingly, the present inventors have found that the individual electrodes 58 may be formed as rings of different diameters and that they may be arranged concentrically in alignment with the center of microelectronic workpiece 25. It will be recognized, however, that grid arrays or other electrode array configurations may also be employed without departing from the scope of the present invention. One suitable configuration of the reactor base 35 and electrode array 56 is disclosed in U.S. Ser. No. 09/804,696, filed Mar. 12, 2001, while another suitable configuration is disclosed in U.S. Ser. No. 09/804,697, filed Mar. 12, 2001, both of which are hereby incorporated by reference.

When the reactor 20 electroplates at least one surface of microelectronic workpiece 25, the plating surface of the workpiece 25 functions as a cathode in the electrochemical reaction and the electrode array 56 functions as an anode. To this end, the plating surface of workpiece 25 is connected to a negative potential terminal of a power supply 60 through contacts 85 and the individual electrodes 58 of the electrode array 56 are connected to positive potential terminals of the supply 60. In the illustrated embodiment, each of the individual electrodes 58 is connected to a discrete terminal of the supply 60 so that the supply 60 may individually set and/or alter one or more electrical parameters, such as the current flow, associated with each of the individual electrodes 58. As such, each of the individual electrodes 58 of FIG. 3 is an individually controllable electrode. It will be recognized, however, that one or more of the individual electrodes 58 of the electrode array 56 may be connected to a common node/terminal of the power supply 60. In such instances, the power supply 60 will alter the one or more electrical parameters of the commonly connected electrodes 58 concurrently, as opposed to individually, thereby effectively making the commonly connected electrodes 58 a single, individually controllable electrode. As such, individually controllable electrodes lo can be physically distinct electrodes that are connected to discrete terminals of power supply 60 as well as physically distinct electrodes that are commonly connected to a single discrete terminal of power supply 60. The electrode array 56 preferably comprises at least two individually controllable electrodes.

The electrode array 56 and the power supply 60 facilitate localized control of the electrical parameters used to electrochemically process the microelectronic workpiece 25. This localized control of the electrical parameters can be used to enhance the uniformity of the electrochemical processing across the surface of the microelectronic workpiece when compared to a single electrode system. Unfortunately, determining the electrical parameters for each of the electrodes 58 in the array 56 to achieve the desired process uniformity can be difficult. The optimizer, however, simplifies and substantially automates the determination of the electrical parameters associated with each of the individually controllable electrodes. In particular, the optimizer determines a plurality of sensitivity values, either experimentally or through numerical simulation, and subsequently uses the sensitivity values to adjust the electrical parameters associated with each of the individually controllable electrodes. The sensitivity values may be placed in a table or may be in the form of a Jacobian matrix. This table/matrix holds information corresponding to process parameter changes (i.e., thickness of the electroplated film) at various points on the workpiece 25 due to electrical parameter perturbations (i.e., electrical current changes) to each of the individually controllable electrodes. This table/matrix is derived from data from a baseline workpiece plus data from separate runs with a perturbation of a controllable electrical parameter to each of the individually controllable electrode.

The optimizer typically executes in a control system 65 that is connected to the power supply 60 in order to supply current values for a plating cycle. The control system 65 can take a variety of forms, including general- or special-purpose computer systems, either integrated into the manufacturing tool containing the reaction chamber or separate from the manufacturing tool. The control system may be communicatively connected to the power supply 60, or may output current values that are in turn manually inputted to the power supply. Where the control system is connected to the power supply by a network, other computer systems and similar devices may intervene between the control system and the power supply. In many embodiments, the control system contains such components as one or more processors, a primary memory for storing programs and data, a persistent memory for persistently storing programs and data, input/output devices, and a computer-readable medium drive, such as a CD-ROM drive or a DVD drive.

Figure 4:
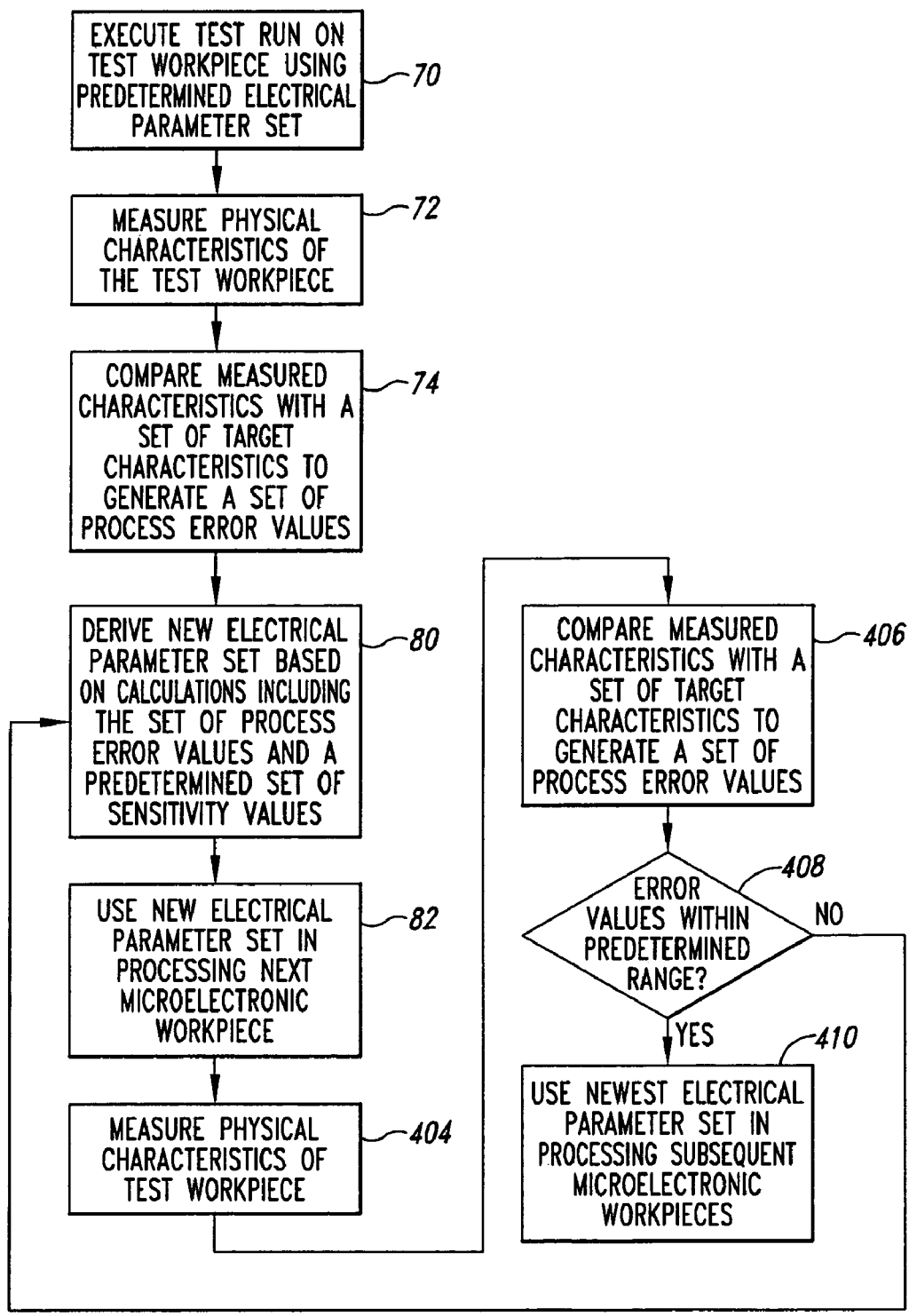
FIG. 4 is a flowchart illustrating one manner in which the optimizer of FIG. 3 can use a predetermined set of sensitivity values to generate a more accurate electrical parameter set for use in meeting targeted physical characteristics in the processing of a microelectronic workpiece.

Once the values for the sensitivity table/matrix have been determined, the values may be stored in and used by control system 65 to control one or more of the electrical parameters that power supply 60 uses in connection with each of the individually controllable electrodes 58. FIG. 4 is a flow diagram illustrating one manner in which the sensitivity table/matrix may be used to calculate an electrical parameter (i.e., current) for each of the individually controllable electrodes 58 that may be used to meet a target process parameter (i.e., target thickness of the electroplated film).

In the process of FIG. 4, control system 65 utilizes two sets of input parameters along with the sensitivity table/matrix to calculate the required electrical parameters. A first set of input parameters corresponds to the data derived from a test run of the process while using a known, predetermined set of electrical parameters, as shown at step 70. For example, a test run can be performed by subjecting a microelectronic workpiece 25 to an electroplating process in which the current provided to each of the individually controllable electrodes 58 is fixed at a predetermined magnitude for a given period of time.

After the test run is complete, the physical characteristics (i.e., thickness of the electroplated film) of the test workpiece are measured, as at step 72, and compared against a second set of input parameters at step 74. In the illustrated embodiment of the method, the second set of input parameters corresponds to the target physical characteristics of the microelectronic workpiece that are to be ultimately achieved by the process (i.e., the thickness of the electroplated film). Notably, the target physical characteristics can either be uniform over the surface of the microelectronic workpiece 25 or vary over the surface. For example, in the illustrated embodiment, the thickness of an electroplated film on the surface of the microelectronic workpiece 25 can be used as the target physical characteristic, and the user may expressly specify the target thicknesses at various radial distances from the center of the workpiece, a grid relative to the workpiece, or other reference systems relative to fiducials on the workpiece.

The first and second set of input parameters are used at step 74 to generate a set of process error values. To ensure the integrity of the data obtained during the test run, the process error values may be checked at step 76 to make sure that the values fall within a predetermined range, tolerance, etc. If the process error values do not pass this test, a further test run on a further test workpiece may be executed using a different predetermined electrical parameter set, as at step 78, and the method begins again. If the process error values satisfy the test at step 76, the control system 65 derives a new electrical parameter set based on calculations including the set of process error values and the values of the sensitivity table/matrix, as at step 80. Once the new electrical parameter set is derived, the control system 65 directs power supply 60 to use the derived electrical parameters in processing the next microelectronic workpiece, as at step 82. Then, in step 404, the optimizer measures physical characteristics of the test workpiece in a manner similar to step 72. In step 406, the optimizer compares the characteristics measured in step 404 with a set of target characteristics to generate a set of process error values. The set of target characteristics may be the same set of target characteristics as used in step 74, or may be a different set of target characteristics. In step 408, if the error values 25 generated in step 406 are within a predetermined range, then the optimizer continues in step 410, else the facility continues in 80. In step 80, the optimizer derives a new electrical parameter set. In step 410, the optimizer uses the newest electrical parameter derived in step 80 in processing subsequent microelectronic workpieces.

With reference again to FIG. 3, the first and second set of input 30 parameters may be provided to the control system 65 by a user interface 84 and/or a metrics tool 86. The user interface 84 can include a keyboard, a touch-sensitive screen, a voice recognition system, and/or other input devices. The metrics tool 86 may be an automated tool that is used to measure the physical characteristics of the test workpiece after the test run, such as a metrology station. When both a user interface 84 and a metrics tool 86 are employed, the user interface 84 may be used to input the target physical characteristics that are to be achieved by the process while metrics tool 86 may be used to directly communicate the measured physical characteristics of the test workpiece to the control system 65. In the absence of a metrics tool that can communicate with control system 65, the measured physical characteristics of the test workpiece can be provided to control system 65 through the user interface 84, or by removable data storage media, such as a floppy disk. It will be recognized that the foregoing are only examples of suitable data communications devices and that other data communications devices may be used to provide the first and second set of input parameters to control system 65.

Figure 5:
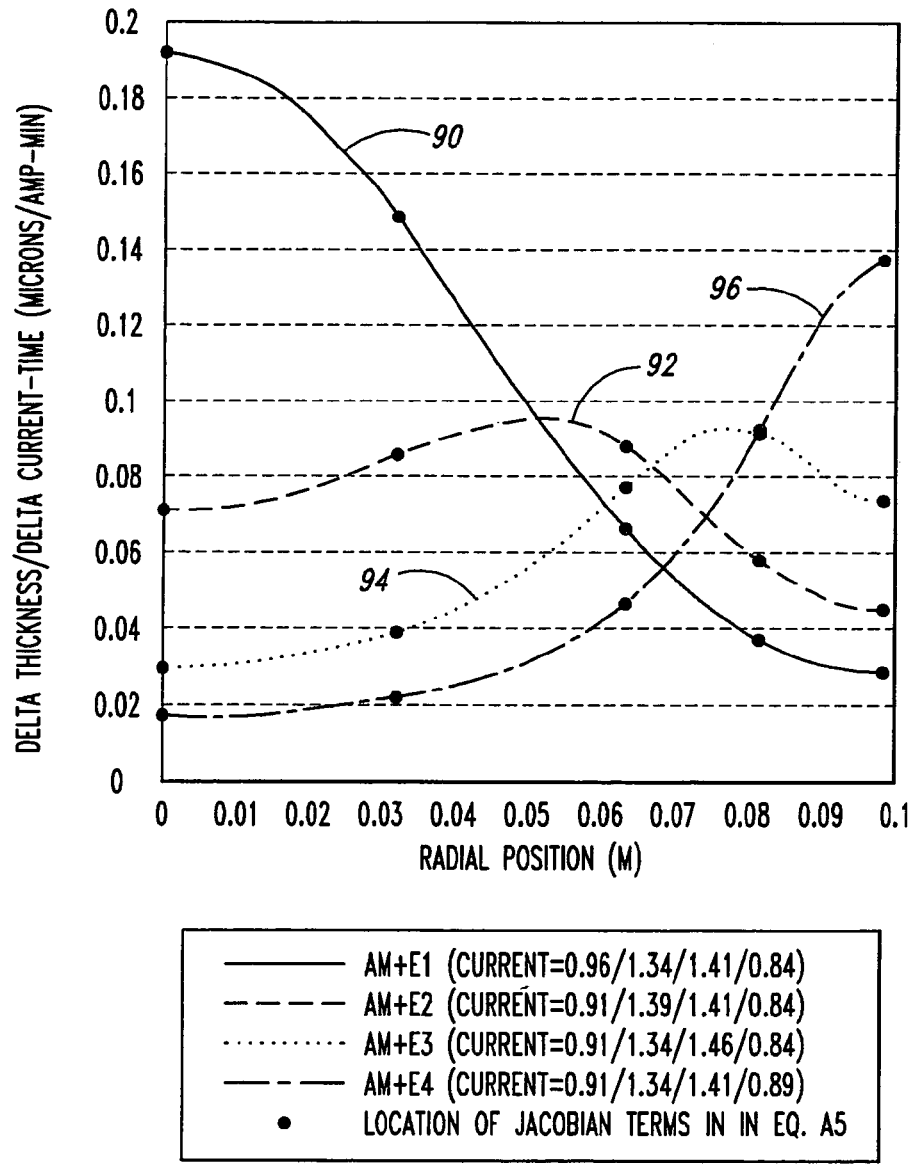
FIG. 5 is a graph of the change in electroplated film thickness per change in current-time as a function of radial position on a microelectronic workpiece for each of a plurality of individually controlled anodes, such as those shown at A1–A4 of FIG. 1.

The optimizer can further be understood with reference to a specific embodiment in which the electrochemical process is electroplating, the thickness of the electroplated film is the target physical parameter, and the current provided to each of the individually controlled electrodes 58 is the electrical parameter that is to be controlled to achieve the target film thickness. In accordance with this specific embodiment, a Jacobian sensitivity matrix is first derived from experimental or numerically simulated data. FIG. 5 is a graph of the Jacobian sensitivity matrix data. In particular, FIG. 5 is a graph of a sample change in electroplated film thickness per change in current-time as a function of radial position on the microelectronic workpiece 25 for each of the individually controlled anodes A1–A4 shown in FIG. 3. A first baseline workpiece is electroplated for a predetermined period of time using a predetermined set of current values to individually controlled anodes A1–A4. The thickness of the resulting electroplated film is then measured as a function of the radial position on the workpiece. These data points are then used as baseline measurements that are compared to the data acquired as the current to each of the anodes A1–A4 is perturbated. Line 90 is a plot of the data points associated with a perturbation in the current provided by power supply 60 to anode A1 with the current to the remaining anodes A2–A4 held at their constant predetermined values. Line 92 is a plot of the data points associated with a perturbation in the current provided by power supply 60 to anode A2 with the current to the remaining anodes A1 and A3–A4 held at their constant predetermined values. Line 94 is a plot of the data points associated with a perturbation in the current provided by power supply 60 to anode A3 with the current to the remaining anodes A1–A2 and A4 held at their constant predetermined values. Lastly, line 96 is a plot of the data points associated with a perturbation in the current provided by power supply 60 to anode A4 with the current to the remaining anodes A1–A3 held at their constant predetermined values.

FIG. 5 shows the growth of an electroplated film versus the radial position across the surface of a microelectronic workpiece for each of the anodes A1–A4. In this illustration, curve 90 corresponds to anode A1 and the remaining curves correspond to anodes A2–A4 proceeding from the interior most anode to the outermost anode. As can be seen from this graph, anode A1, being effectively at the largest distance from the surface of the workpiece, has an effect over a substantial radial portion of the workpiece. In contrast, the remaining anodes have substantially more localized effects at the radial positions corresponding to the peaks of the graph of FIG. 5. Anodes A1–A4 may be consumable, but they are generally inert and formed from platinized titanium or some other inert conductive material.

In order to predict change in the thickness as a function of a change in current, a Jacobian sensitivity matrix is generated numerically using a computational model of the plating chamber. The modeled data includes a baseline film thickness profile and as many perturbation curves as anodes, where each perturbation curve involves adding roughly 0.05 amps to one specific anode. The Jacobian is a matrix of partial derivatives, representing the change in thickness in microns over the change in current in amp minutes. Specifically, the Jacobian is an m×n matrix where m, the number of rows, is equal to the number of data points in the modeled data and n, the number of columns, is equal to the number of anodes on the reactor. Typically, the value of m is relatively large (>100) due to the computational mesh chosen for the model of the chamber. The components of the matrix are calculated by taking the quotient of the difference in thickness due to the perturbed anode and the current change in amp-minutes, which is the product of the current change in amps and the run time in minutes.

For simplicity, the number of rows is reduced to the number of radial test points within a standard contour map (4 for 200 mm and 6 for 300 mm) plus one, where the extra point is added to better the 3 sigma uniformity for all the points (i.e., to better the diameter scan). A trial and error method is used for the precise location of this point, which is defined to be between the two outermost radial points in the standard map.

A specific map may be designed for the metrology station, which will measure the appropriate points on the wafer corresponding with the radial positions necessary for the optimizer operation.

The data for the Jacobian parameters shown in FIG. 5 may be computed using the following equations:

$$J_{ij} = \frac{\partial t_i}{\partial AM_j} \cong \frac{t_i(AM + \varepsilon_j) - t_i(AM)}{|\varepsilon_j|}$$ Equation (A1)

$$t(AM) = \begin{pmatrix} \hat{e} \\ e_1 \end{pmatrix}(AM) \ t_2(AM) \dots t_m(AM) \begin{pmatrix} \grave{u} \\ u \end{pmatrix}$$ Equation (A2)

$$AM = [AM_1 \ AM_2 \ x \ x \ AM_n]$$ Equation (A3)

$$\varepsilon_1 = \begin{bmatrix} \Delta AM_1 \\ 0 \\ \vdots \\ 0 \end{bmatrix} \varepsilon_2 = \begin{bmatrix} 0 \\ \Delta AM_2 \\ 0 \\ \vdots \\ 0 \end{bmatrix} \dots \varepsilon_n = \begin{bmatrix} 0 \\ \vdots \\ 0 \\ \Delta AM_n \end{bmatrix}$$ Equation (A4)

where:

t represents thickness [microns];

AM represents current [amp-minutes];

$\varepsilon$ represents perturbation [amp-minutes];

i is an integer corresponding to a radial position on the workpiece;

j is an integer representing a particular anode;

m is an integer corresponding to the total number of radial positions on the workpiece; and n is an integer representing the total number of individually-controllable anodes.

The Jacobian sensitivity matrix, set forth below as Equation (A5), is an index of the Jacobian values computed using Equations (A1)–(A4). The Jacobian matrix may be generated either using a simulation of the operation of the deposition chamber based upon a numerical model of the deposition chamber, or using experimental data derived from the plating of one or more test wafers. Construction of such a numerical model, as well as its use to simulate operation of the modeled deposition chamber, is discussed in detail in G. Ritter, P. McHugh, G. Wilson and T. Ritzdorf, "Two- and three-dimensional numerical modeling of copper electroplating for advanced ULSI metallization," Solid State Electronics, volume 44, issue 5, pp. 797–807 (May 2000), available from http://www.elsevier.nl/gej-ng/10/30/25/29/28/27/article.pdf, also available from htttp://journals.ohiolink.edu/pdflinks/01040215463800982.pdf.

$$J = \begin{vmatrix} 0.192982 & 0.071570 & 0.030913 & 0.017811 \\ 0.148448 & 0.084824 & 0.039650 & 0.022264 \\ 0.066126 & 0.087475 & 0.076612 & 0.047073 \\ 0.037112 & 0.057654 & 0.090725 & 0.092239 \\ 0.029689 & 0.045725 & 0.073924 & 0.138040 \end{vmatrix}$$ Equation (A5)

The values in the Jacobian matrix are also presented as highlighted data points in the graph of FIG. 5. These values correspond to the radial positions on the surface of a semiconductor wafer that are typically chosen for measurement. Once the values for the Jacobian sensitivity matrix have been derived, they may be stored in control system 65 for further use.

Table 1 below sets forth exemplary data corresponding to a test run in which a 200 mm wafer is plated with copper in a multiple anode system using a nominally 2000 Å thick initial copper seed-layer. Identical currents of 1.12 Amps (for 3 minutes) were provided to all four anodes A1–A4. The resulting thickness at five radial locations was then measured and is recorded in the second column of Table 1. The 3 sigma uniformity of the wafer is 9.4% using a 49 point contour map. Target thickness were then provided and are set forth in column 3 of Table 1. In this example, because a flat coating is desired, the target thickness is the same at each radial position. The thickness errors (processed errors) between the plated film and the target thickness were then calculated and are provided in the last column of Table 1. These calculated thickness errors are used by the optimizer as a source of feedback control.

TABLE 1

DATA FROM WAFER PLATED WITH 1.12 AMPS TO EACH ANODE.

| Radial Location (m) | Measured Thickness (microns) | Target Thickness (microns) | Error (microns) |
| --- | --- | --- | --- |
| 0 | 1.1081 | 1.0291 | −0.0790 |
| 0.032 | 1.0778 | 1.0291 | −0.0487 |
| 0.063 | 1.0226 | 1.0291 | 0.0065 |
| 0.081 | 1.0169 | 1.0291 | 0.0122 |
| 0.098 | 0.09987 | 1.0291 | 0.0304 |

The Jacobian sensitivity matrix may then be used along with the thickness error values to provide a revised set of anode current values that should yield better film uniformity. The equations summarizing this approach are set forth below:

$$\Delta AM = J^{-1} \Delta t$$

(for a square system in which the number of measured radial positions corresponds to the number of individually controlled anodes in the system); and $$\Delta AM = (J^T J)^{-1} J^T \Delta t$$

(for a non-square system in which the number of measured radial positions is different than the number of individually controlled anodes in the system).

Table 2 shows the foregoing equations as applied to the given data set and the corresponding current changes that have been derived from the equations to meet the target thickness at each radial location (best least square fit). Such application of the equations, and construction of the Jacobian matrix is in some embodiments performed using a spreadsheet application program, such as Microsoft Excel®, in connection with specialized macro programs. In other embodiments, different approaches are used in constructing the Jacobian matrix and applying the above equations.

The wafer uniformity obtained with the currents in the last column of Table 2 was 1.7% (compared to 9.4% for the test run wafer). This procedure can be repeated again to try to further improve the uniformity. In this example, the differences between the seed layers were ignored.

TABLE 2

CURRENT ADJUSTMENT

| Anode # | Anode Currents for Run #1 (Amps) | Change to Anode Currents (Amps) | Anode Currents for Run #2 (Amps) |
|---|---|---|---|
| 1 | 1.12 | −0.21 | 0.91 |
| 2 | 1.12 | 0.20 | 1.32 |
| 3 | 1.12 | −0.09 | 1.03 |
| 4 | 1.12 | 0.10 | 1.22 |

Once the corrected values for the anode currents have been calculated, control system 65 of FIG. 3 directs power supply 60 to provide the corrected current to the respective A1–A4 during subsequent processes to meet the target film thickness and uniformity.

In some instances, it may be desirable to iteratively apply the foregoing equations to arrive at a set of current change values (the values shown in column 3 of Table 2) that add up to zero. For example, doing so enables the total plating charge—and therefore the total mass of plated material—to be held constant without having to vary the recipe time.

The Jacobian sensitivity matrix in the foregoing example quantifies the system respond to anode current changes about a baseline condition. Ideally, a different matrix may be employed if the processing conditions vary significantly from the baseline. The system parameters that may influence the sensitivity values of the sensitivity matrix is quite large. Such system parameters include the seed layer thickness, the electrolyte conductivity, the metal being plated, the film thickness, the plating rate, the contact ring geometry, the wafer position relative to the chamber, and the anode shape/current distribution. Anode shape/current distribution is included to accommodate chamber designs where changes in the shape of consumable anodes over time affect plating characteristics of the chamber. Changes to all of these items can change the current density across the wafer for a given set of anode currents and, as a result, can change the response of the system to changes in the anode currents. It is expected, however, that small changes to many of these parameters will not require the calculation of a new sensitivity matrix. Nevertheless, a plurality of sensitivity tables/matrices may be derived for different processing conditions and stored in control system 65. Which of the sensitivity tables/matrices is to be used by the control system 65 can be entered manually by a user, or can be set automatically depending on measurements taken by certain sensors or the like (i.e., temperature sensors, chemical analysis units, etc.) that indicate the existence of one or more particular processing conditions.

The optimizer may also be used to compensate for differences and non-uniformities of the initial seed layer of the microelectronic workpiece. Generally stated, a blanket seed layer can affect the uniformity of a plated film in two ways:

1. If the seed layer non-uniformity changes, this non-uniformity is added to the final film. For example, if the seed layer is 100 Å thinner at the outer edge than expected, the final film thickness may also be 100 Å thinner at the outer edge.

2. If the average seed-layer thickness changes significantly, the resistance of the seed-layer will change resulting in a modified current density distribution across the wafer and altered film uniformity. For example, if the seed layer decreases from 2000Å to 1000Å, the final film will not only be thinner (because the initial film is thinner) but it will also be relatively thicker at the outer edge due to the higher resistivity of the 1000Å seed-layer compared to the 2000 Å seed-layer (assuming an edge contact).

The optimizer can be used to compensate for such seed-layer deviations, thereby utilizing seed-layer thicknesses as a source of feed-forward control. In the first case above, the changes in seed-layer uniformity may be handled in the same manner that errors between target thickness and measured thickness are handled. A pre-measurement of the wafer quantifies changes in the seed-layer thickness at the various radial measurement locations and these changes (errors) are figured into the current adjustment calculations. Using this approach, excellent uniformity results can be obtained on the new seed layer, even on the first attempt at electroplating.

In the second case noted above, an update of or selection of another stored sensitivity/Jacobian matrix can be used to account for a significantly different resistance of the seed-layer. A simple method to adjust for the new seed layer thickness is to plate a film onto the new seed layer using the same currents used in plating a film on the previous seed layer. The thickness errors measured from this wafer can be used with a sensitivity matrix appropriate for the new seed-layer to adjust the currents.

The optimizer may also be used to compensate for reactor-to-reactor variations in a multiple reactor system, such as the LT-210C™ available from Semitool, Inc., of Kalispell, Mont. In such a system, there is a possibility that the anode currents required to plate a specified film might be different on one reactor when compared to another. Some possible sources for such differences include variations in the wafer position due to tolerances in the lift-rotate mechanism, variations in the current provided to each anode due to power supply manufacturing tolerances, variations in the chamber geometry due to manufacturing tolerances, variations in the plating solution, etc.

In a single anode system, the reactor-to-reactor variation is typically reduced either by reducing hardware manufacturing tolerances or by making slight hardware modifications to each reactor to compensate for reactor variations. In a multiple anode reactor constructed in accordance with the teachings of the present invention, reactor-to-reactor variations can be reduced/eliminated by running slightly different current sets in each reactor. As long as the reactor variations do not fundamentally change the system response (i.e., the sensitivity matrix), the self-tuning scheme disclosed herein is expected to find anode currents that meet film thickness targets. Reactor-to-reactor variations can be quantified by comparing differences in the final anode currents for each chamber. These differences can be saved in one or more offset tables in the control system 65 so that the same recipe may be utilized in each reactor. In addition, these offset tables may be used to increase the efficiency of entering 30 new processing recipes into the control system 65. Furthermore, these findings can be used to trouble-shoot reactor set up. For example, if the values in the offset table are over a particular threshold, the deviation may indicate a hardware deficiency that needs to be corrected.

To further illuminate the operation of the optimizer, a second test run is described.

The optimization process begins with a baseline current set or standard recipe currents. A wafer must be pre-read for seed layer thickness data, and then plated using the indicated currents. After plating, the wafer is re-measured for the final thickness values. The following wafer must also be pre-read for seed layer thickness data. Various points at the standard five radial positions (0 mm, 31.83 mm, 63.67 mm, 80 mm, 95.5 mm) are typically measured and averaged for each wafer reading.

The thickness data from the previous wafer, and the new wafer seed layer, in addition to the anode currents, are entered into the input page of the optimizer. The user may also elect to input a thickness specification, or chose to modify the plating thickness by adjusting the total current in amp-minutes. After all the data is correctly inputted, the user activates the optimizer. In response, the optimizer predicts thickness changes and calculates new currents.

The new wafer is then plated with the adjusted anode currents and then measured. A second modification may be required if the thickness profile is not satisfactory.

Using a single iteration, the optimizer can predict the currents for the computational model to produce a uniform wafer, whereas two or three iterations are necessary for the lab to achieve an acceptable profile. Good symmetry is one factor for the optimization procedure because the optimizer is assuming the wafer has a constant thickness at a given radial position. Usually, the more symmetric the previous wafer is, the fewer number of iterations are necessary to accomplish the acceptable uniformity. Ensuring good contact on the wafer during plating improves the possibility of achieving adequate symmetry.

When a further iteration is required, the optimization is continued. As before, the post-plated wafer is measured for thickness values, and another wafer is pre-read for a new seed set of seed layer thickness values. Then, the following quantities are entered on the input page:

1. plated wafer thickness,
2. anode currents,
3. plated wafer seed layer thickness, and
4. new wafer seed layer thickness The recipe time and thickness profile specification should be consistent with the previous iteration. The program is now ready to be run again to provide a new set of anode currents for the next plating attempt.

After plating with the new currents, the processed wafer is measured and if the uniformity is still not acceptable, the procedure may be continued with another iteration. The standard value determining the uniformity of a wafer is the 3-$\sigma$, which is the standard deviation of the measured points relative to the mean and multiplied by three. Usually a forty-nine point map is used with measurements at the radial positions of approximately 0 mm, 32 mm, 64 mm, and 95 mm to test for uniformity.

The above procedure will be demonstrated using a multi-iteration example. Wafer #3934 is the first plated wafer using a set of standard anode currents: 0.557/0.818/1.039/0.786 (anode1/ anode2/ anode3/ anode4 in amps) with a recipe time of 2.33 minutes (140 seconds). Before plating, the wafer is pre-read for seed layer data. These thickness values, in microns, from the center to the outer edge, are shown in Table 3:

TABLE 3

SEED LAYER THICKNESS VALUES FOR WAFER #3934

| Radius (mm) | Thickness (μm) |
|---|---|
| 0.00 | 0.130207 |
| 31.83 | 0.13108 |
| 63.67 | 0.131882 |
| 80.00 | 0.129958 |
| 95.50 | 0.127886 |

The wafer is then sent to the plating chamber, and then re-measured after being processed. The resulting thickness values (in microns) for the post-plated wafer #3934 are shown in Table 4:

TABLE 4

THICKNESS VALUES FOR POST-PLATED WAFER #3934

| Radius (mm) | Thickness (μm) |
|---|---|
| 0.00 | 0.615938 |
| 31.83 | 0.617442 |
| 63.67 | 0.626134 |
| 80.00 | 0.626202 |
| 95.50 | 0.628257 |

The 3-$\sigma$ for the plated wafer is calculated to be 2.67% over a range of 230.4 Angstroms. Since the currents are already producing a wafer below 3%, any adjustments are going to be minor. The subsequent wafer has to be pre-read for seed layer values in order to compensate for any seed layer differences. Wafer #4004 is measured and the thickness values in microns are shown in Table 5:

TABLE 5

SEED LAYER THICKNESS VALUES FOR WAFER #4004

| Radius (mm) | Thickness (μm) |
|---|---|
| 0.00 | 0.130308 |
| 31.83 | 0.131178 |
| 63.67 | 0.132068 |
| 80.00 | 0.13079 |
| 95.50 | 0.130314 |

Figure 6:
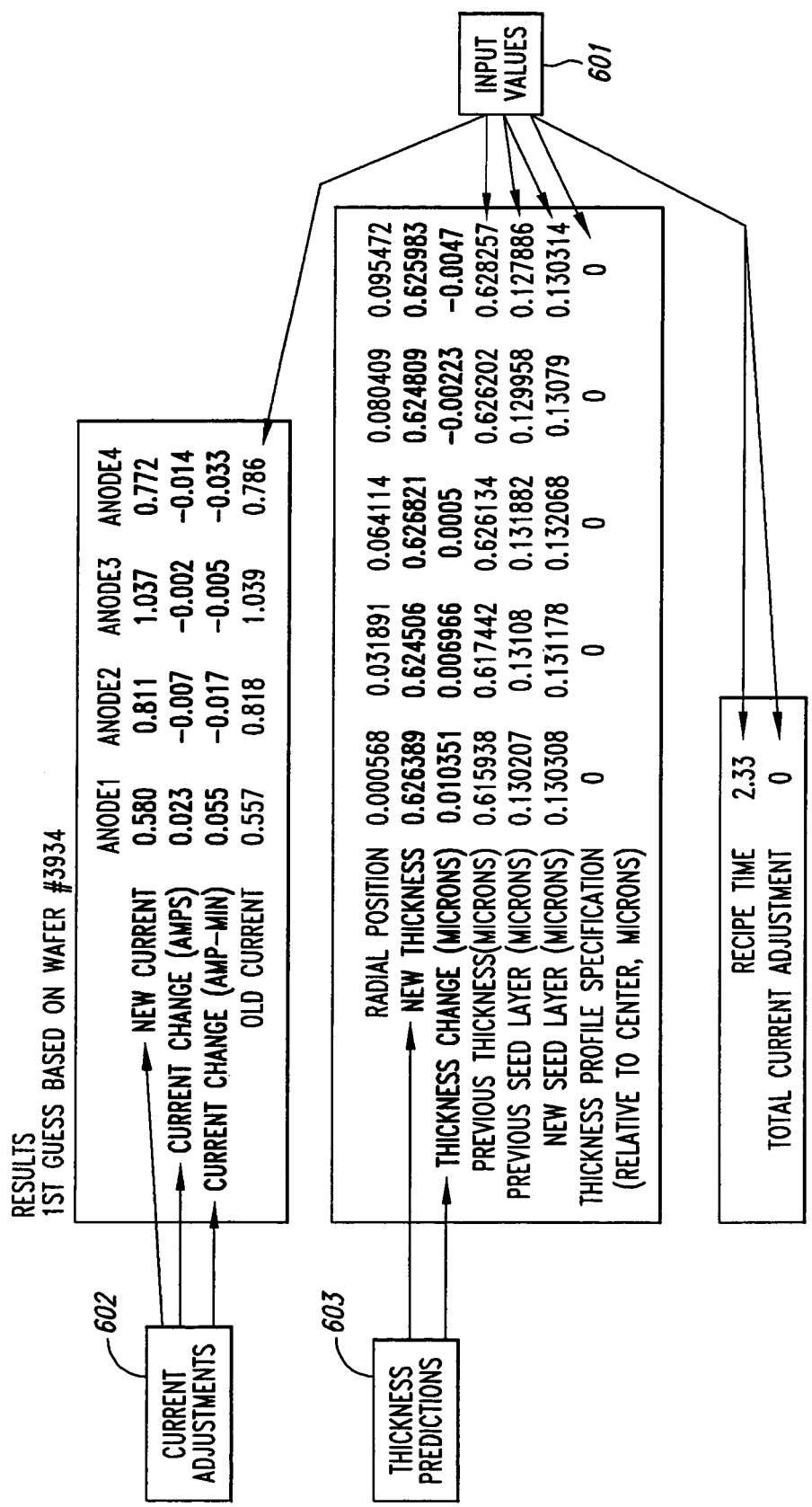
FIG. 6 is a spreadsheet diagram showing the new current outputs calculated from the inputs for the first optimization run.

For this optimization run, there is no thickness profile specification, or overall thickness adjustment. All of the preceding data is inputted into the optimizer, and the optimizer is activated to generate a new set of currents. These currents will be used to plate the next wafer. FIG. 6 is a spreadsheet diagram showing the new current outputs calculated from the inputs for the first optimization run. It can be seen that the input values 601 have generated output 602, including a new current set. The optimizer has also predicted the absolute end changed thicknesses 603 that this new current set will produce.

The new anode currents are sent to the process recipe and run in the plating chamber. The run time and total currents (amp-minutes) remain constant, and the current density on the wafer is unchanged. The new seed layer data from this run for wafer #4004 will become the old seed layer data for the next iteration.

The thickness (microns) resulting from the adjusted currents plated on wafer #4004 are shown in Table 6:

TABLE 6

THICKNESS VALUES FOR POST-PLATED WAFER #4004

| Radius (mm) | Thickness (µm) |
|---|---|
| 0.00 | 0.624351 |
| 31.83 | 0.621553 |
| 63.67 | 0.622704 |
| 80.00 | 0.62076 |
| 95.50 | 0.618746 |

The post-plated wafer has a 3-σ of 2.117% over a range of 248.6 Angstroms. To do another iteration, a new seed layer measurement is required, unless notified that the batch of wafers has equivalent seed layers. Wafer # 4220 is pre-measured and the thickness values in microns are shown in Table 7:

TABLE 7

SEED LAYER THICKNESS VALUES FOR WAFER #4220

| Radius (mm) | Thickness (µm) |
|---|---|
| 0.00 | 0.127869 |
| 31.83 | 0.129744 |
| 63.67 | 0.133403 |
| 80.00 | 0.134055 |
| 95.50 | 0.1335560 |

Figure 7:
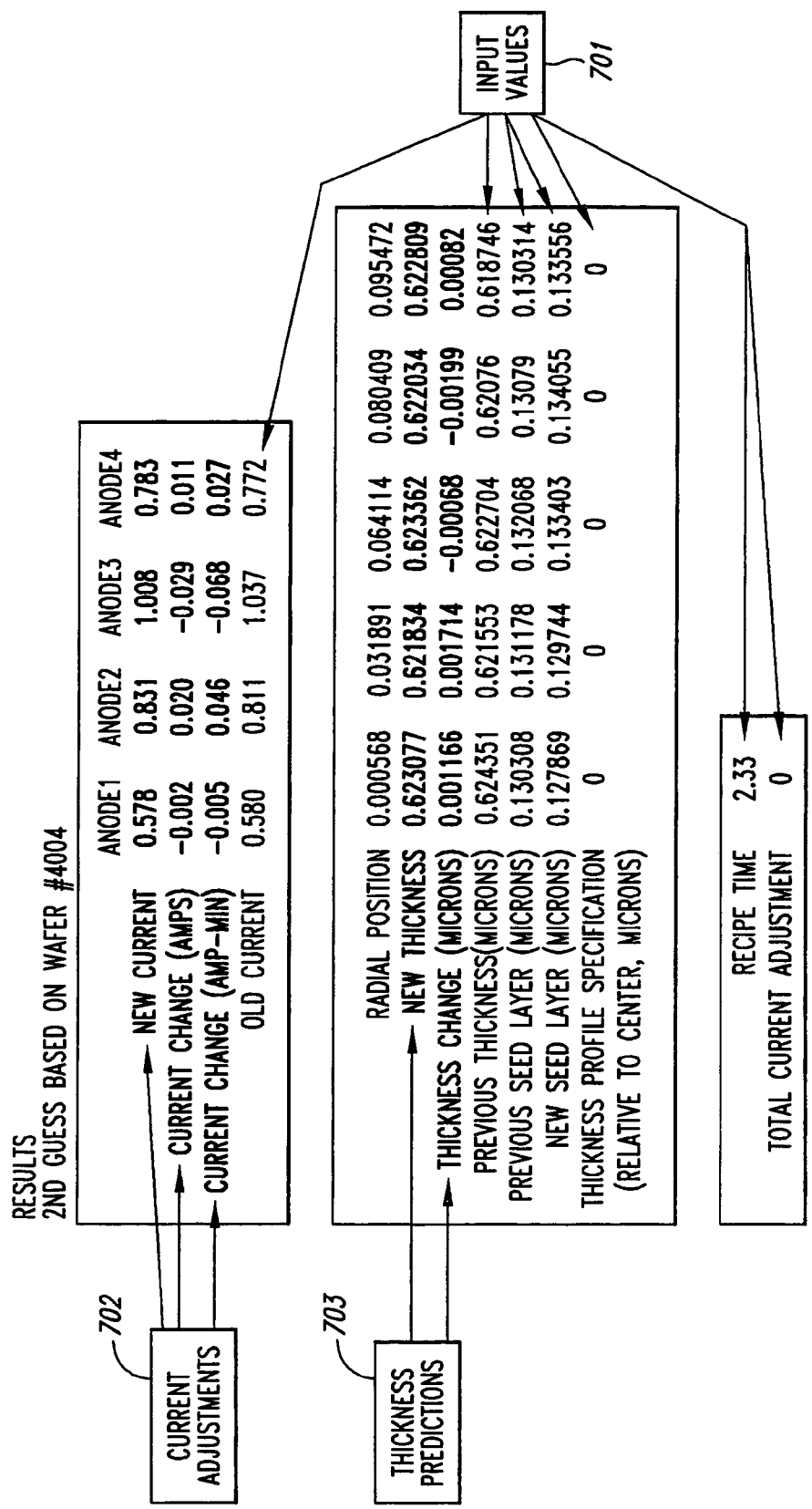
FIG. 7 is a spreadsheet diagram showing the new current outputs calculated from the inputs for the second optimization run.

Again, all of the new data is inputted into the optimizer, along with the currents used to plate the new wafer and the thickness of the plated wafer's seed. The optimizer automatically transfers the new currents into the old currents among the inputs. The optimizer is then activated to generate a new set of currents. FIG. 7 is a spreadsheet diagram showing the new current outputs calculated from the inputs for the second optimization run. It can be seen that, from input value 701, the optimizer has produced output 702 including a new current set. It can further be seen that that the facility has predicted absolute and changed thicknesses 703 that will be produced using the new currents.

The corrected anode currents are again sent to the recipe and applied to the plating process. The $2^{nd}$ adjustments on the anode currents produce the thickness values in microns shown in Table 8:

TABLE 8

THICKNESS VALUES FOR POST-PLATED WAFER #4220

| Radius (mm) | Thickness (µm) |
|---|---|
| 0.00 | 0.624165 |
| 31.83 | 0.622783 |
| 63.67 | 0.626911 |
| 80.00 | 0.627005 |
| 95.50 | 0.623823 |

The 3-σ for wafer #4220 is 1.97% over a range of 213.6 Angstroms. The procedure may continue to better the uniformity, but the for the purpose of this explanation, a 3-σ below 2% is acceptable.

Numerous modifications may be made to the described optimizer without departing from the basic teachings thereof. For example, although the present invention is described in the context of electrochemical processing of the microelectronic workpiece, the teachings herein can also be extended to other types of microelectronic workpiece processing, including various kinds of material deposition processes. For example, the optimizer may be used to control electrophoretic deposition of material, chemical or physical vapor deposition, etc. In effect, the teachings herein can be extended to other microelectronic workpiece processing systems that have individually controlled processing elements that are responsive to control parameters and that have interdependent effects on a physical characteristic of the microelectronic workpiece that is processed using the elements. Such systems may employ sensitivity tables/matrices as set forth herein and use them in calculations with one or more input parameters sets to arrive at control parameter values that accurately result in the targeted physical characteristic of the microelectronic workpiece. Although the present invention has been described in substantial detail with reference to one or more specific embodiments, those of skill in the art will recognize that changes may be made thereto without departing from the scope and spirit of the invention as set forth herein.

We claim:

1. A method in a computing system for automatically configuring parameters controlling operation of an electrochemical deposition chamber to deposit material on each of a sequence of workpieces to improve conformity with a specified deposition pattern, comprising:
    for each of the sequence of workpieces, measuring thicknesses of the workpiece before material is deposited on the workpiece;
    for each of the sequence of workpieces, measuring thicknesses of the workpiece after material is deposited on the workpiece; and
    for each of the sequence of workpieces, configuring the parameters for depositing material on the workpiece based on the specified deposition pattern, the measured thickness of the current workpiece before material is deposited on the current workpiece, the measured thickness of the previous workpiece in the sequence before material is deposited on the previous workpiece, the parameters used for depositing material on the previous workpiece, and the measured thicknesses of the previous workpiece after material is deposited on the previous workpiece.

2. The method of claim 1 wherein the specified deposition pattern is a flat deposition pattern.

3. The method of claim 1 wherein the specified deposition pattern is a concave deposition pattern.

4. The method of claim 1 wherein the specified deposition pattern is a convex deposition pattern.

5. The method of claim 1 wherein the specified deposition pattern is an arbitrary radial profile.

6. The method of claim 1 wherein the specified deposition pattern is an arbitrary profile.

7. The method of claim 1, further comprising, for a second deposition chamber:
    retrieving a set of offset values characterizing differences between the electrochemical deposition chamber and the second electrochemical deposition chamber;
    modifying the parameters most recently configured for the electrochemical deposition chamber in accordance with the retrieved set of offset values to obtain a parameters for the second electrochemical deposition chamber; and
    configuring the second electrochemical deposition chamber with the obtained parameters for the second electrochemical deposition chamber.

8. An apparatus for automatically configuring parameters controlling operation of an electrochemical deposition chamber to deposit material on each of a sequence of workpieces to improve conformity with a specified deposition pattern, comprising:

a pre-deposition measuring subsystem that measures thicknesses of each of the sequence of workpieces before material is deposited on the workpiece;

a post-deposition measuring subsystem that measures thicknesses of each of the sequence of workpieces after material is deposited on the workpiece; and a parameter configuration subsystem that configures the parameters for depositing material on each of the sequence of workpieces based on the specified deposition pattern, the measured thickness of the current workpiece before material is deposited on the current workpiece, the measured thickness of the previous workpiece in the sequence before material is deposited on the previous workpiece, the parameters used for depositing material on the previous workpiece, and the measured thicknesses of the previous workpiece after material is deposited on the previous workpiece.

9. One or more computer memories collectively containing a data structure for controlling an electrochemical deposition process, comprising a set of parameter values used in the electrochemical deposition process, the parameters having been generated by adjusting an earlier-used set of parameters to resolve differences between measurements of a workpiece deposited using the earlier-used set of parameters and a target deposition profile specified for the electrochemical deposition process, the contents of the data structure being usable to deposit an additional workpiece in greater conformance with the specified deposition profile.

10. The computer memories of claim 9 wherein the electrochemical deposition process utilizes a plurality of electrodes, and wherein each parameter value of the set is an amount of current to be delivered through one of the plurality of electrodes.

11. One or more computer memories collectively containing a deposition chamber offset data structure, comprising a set of values indicating how to adjust a first parameter set used to obtain acceptable deposition results in a first deposition chamber to produce a second parameter set usable to obtain acceptable deposition results in a second deposition chamber.

\* \* \* \* \*

UNITED STATES PATENT AND TRADEMARK OFFICE
CERTIFICATE OF CORRECTION

PATENT NO. : 7,020,537 B2
APPLICATION NO. : 09/849505
DATED : March 28, 2006
INVENTOR(S) : Gregory J. Wilson et al.

It is certified that error appears in the above-identified patent and that said Letters Patent is hereby corrected as shown below:

Column 3
Line 9, delete "lo";

Column 6
Line 28, delete "5";
Line 65, delete "30";

Column 9
Line 41, delete "25";
Line 49, delete "30";

Column 13
Line 39, "respond" should be --response--;

Column 14
Line 65, delete "30";

Column 18
Line 60, delete "a";

Signed and Sealed this

Eleventh Day of July, 2006

JON W. DUDAS
*Director of the United States Patent and Trademark Office*

UNITED STATES PATENT AND TRADEMARK OFFICE
CERTIFICATE OF CORRECTION

PATENT NO. : 7,020,537 B2 Page 1 of 1
APPLICATION NO. : 09/849505
DATED : March 28, 2006
INVENTOR(S) : Wilson et al.

It is certified that error appears in the above-identified patent and that said Letters Patent is hereby corrected as shown below:

Front Page
Abstract, insert --model-- between "numerical" and "of";

Column 7
Line 60, delete "lo"

Column 13
Line 10, "Table 2was" should be --Table 2 was--;

Signed and Sealed this

Sixth Day of March, 2007

JON W. DUDAS
*Director of the United States Patent and Trademark Office*